(12) United States Patent
Yao

(10) Patent No.: US 7,512,614 B2
(45) Date of Patent: Mar. 31, 2009

(54) SYSTEM AND METHOD FOR DATA ETL IN A DATA WAREHOUSE ENVIRONMENT

(75) Inventor: Albert Zhongxing Yao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 10/460,425

(22) Filed: Jun. 12, 2003

(65) Prior Publication Data

US 2004/0254948 A1    Dec. 16, 2004

(51) Int. Cl.
G06F 17/00 (2006.01)
(52) U.S. Cl. .............................. 707/101; 707/3; 707/204
(58) Field of Classification Search .................. 707/101, 707/3, 204
See application file for complete search history.

(56) References Cited

U.S. PATENT DOCUMENTS

| | | | | |
|---|---|---|---|---|
| 5,875,334 | A * | 2/1999 | Chow et al. ................. | 717/141 |
| 6,212,524 | B1 * | 4/2001 | Weissman et al. ........... | 707/101 |
| 6,236,997 | B1 * | 5/2001 | Bodamer et al. ............. | 707/10 |
| 6,714,945 | B1 * | 3/2004 | Foote et al. ................. | 707/104.1 |
| 7,174,342 | B1 * | 2/2007 | Scheurich et al. ........... | 707/102 |
| 7,287,034 | B2 * | 10/2007 | Wong et al. ................. | 707/101 |

FOREIGN PATENT DOCUMENTS

| EP | 1 093 060 A2 * | 5/2000 |
|---|---|---|
| EP | 1093060 A2 * | 4/2001 |

OTHER PUBLICATIONS

Rifaieh et al., "Query-based Data Warehousing Tool", ACM: 2002, pp. 35-42.*
Gupta, http://system-services.com/dwintro.asp, "An Introduction to Data Warehousing", Mar. 25, 2003, pp. 1-22.

* cited by examiner

*Primary Examiner*—Charles Rones
*Assistant Examiner*—Phuong-Thao Cao
(74) *Attorney, Agent, or Firm*—Yee & Associates, P.C.; Libby Z. Handelsman

(57) ABSTRACT

A set of command tags and associated command instructions are provided along with a driver mechanism for converting ETL instructions from a first set of ETL instructions to a second set of ETL instructions. With the system and method, the command tags may be used with a first set of ETL instructions to indicate the manner by which these ETL instructions are to be executed. The tags are identified by the driver mechanism and associated with one or more command instructions. The command instructions are loaded along with the first set of ETL instructions by the driver mechanism. The driver mechanism converts the first set of ETL instructions into a second set of ETL instructions based on the command instructions associated with the identified tags. The second set of ETL instructions are performed as a plurality of transactions rather than a single transaction.

17 Claims, 10 Drawing Sheets

SYSTEM AND METHOD FOR DATA ETL IN A DATA WAREHOUSE ENVIRONMENT

BACKGROUND OF THE INVENTION

1. Technical Field

The present invention is directed to a system and method for data extract, transform and load (ETL) in a data warehouse environment. More specifically, the present invention provides a command conversion mechanism for dynamically converting ETL commands that operate as a single transaction into a plurality of ETL commands that operate as a plurality of transactions for enhancement of the performance of ETL execution and a system that supports such a mechanism.

2. Description of Related Art

Data warehousing is the process by which data obtained by an operational system is stored in one or more databases separate from the operational system so that this data may be used for business analysis apart from the operational data in the operational system. There are many reasons why the data stored for business analysis is separated from the operational data. First, data may be integrated into a data warehouse from more than one operational system. In this way, data from multiple sources may be cross-referenced so that information regarding the correlation between data may be obtained from the data warehouse.

Second, the operational system's performance may be degraded because of analysis processes that are performed on the operational data. By separating out the data used for business analysis, the analysis operations may be performed separately from the operational aspects of the operational system and thus, a degradation in performance of the operational system is avoided.

Third, data that is stored in the data warehouse is typically non-volatile. That is, the data is not stored in the data warehouse until the data is most likely in its final state and is not going to be modified. For example, the order status does not change, the inventory snapshot does not change, the marketing promotion details do not change, etc. This allows the user that is performing business analysis to rely on the accuracy of the data stored in the data warehouse since it is unlikely that the data has been changed since it was stored in the data warehouse.

Fourth, data from most operational systems is archived after the data becomes inactive. Since the data warehouse is designed as the archive of the operational data, the data is stored for a very long period of time compared to the operational data in the operational system. The cost for maintaining the data in the data warehouse is minimal. As a result, data archived in a data warehouse may be retrievable at remote times from when the data was first obtained.

The data stored in the data warehouse is stored in a structured manner such that the data may be subjected to query and analysis. Typically, this structure takes the form of one or more database tables having records that are structured in a specific manner. These database tables may be queried and analyzed using database query and analysis commands such as are generally known in the art. For example, the Structured Query Language (SQL) is a language used to interrogate and process data in a relational database. Originally developed by International Business Machines, Inc. (IBM) for its mainframes, all database systems designed for client/server environments support SQL. SQL commands can be used to interactively work with a database or can be embedded within a programming language to interface to a database. Programming extensions to SQL have turned it into a full-blown database programming language, and all major database management systems (DBMSs) support the language.

Building a data warehouse involves taking the data from the operational system and storing it in the data warehouse in a structured manner. The process used for moving data from the operational system to the data warehouse is referred to as "extraction, transformation and loading" or ETL. To populate a data warehouse table, the ETL process typically makes use of combined SQL statements such as select-insert, select-update, and the like. These SQL statements are performed in a single transaction within the operational system.

In data warehouse environment, the size of the data to be transferred is usually very large. When SQL statements, such as select-insert and select-update, are performed as a single transaction, a large amount of log space and execution time is required to maintain data about the transaction in order to allow for rollback of the transaction. The performance of the execution usually will be downgraded. Thus, it would be beneficial to have a system and method for optimizing the execution of SQL statements such that the performance of the SQL execution is increased and the log space and execution time is minimized.

SUMMARY OF THE INVENTION

The present invention provides a system and method for data ETL in a data warehouse environment. More specifically, the present invention is directed to a ETL processing of data in an operational system in a manner that minimizes the amount of log space and execution time required to extract, transform and load the data from the operational system into the data warehouse.

The present invention provides a set of tags and associated command instructions along with a driver mechanism for converting ETL instructions from a first set of ETL instructions to a second set of ETL instructions. With the present invention, the tags may be used with a first set of ETL instructions to indicate the manner by which these ETL instructions are to be executed. The tags are identified by the driver mechanism and associated with one or more command instructions. The command instructions are loaded along with the first set of ETL instructions by the driver mechanism. The driver mechanism converts the first set of ETL instructions into a second set of ETL instructions based on the command instructions associated with the identified tags.

For example, based on the command instructions, the driver mechanism can execute a query as it is defined, execute select-insert and select-update combination SQL statements as a plurality of transactions in cursor mode with incremental commitments, execute select-insert and select-update combination SQL statements as a plurality of database export, import and load utility instructions, and the like. For the select-insert SQL statement with in cursor mode, an additional function is provided to update a source table with the key value while the insert is done with the cursor.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides a system and method for data ETL in a data warehouse environment. The present invention is especially suited to a distributed data processing environment in which the data warehouse storage facilities are separated from the operational system. Therefore, FIGS. 1-3 are provided as an example of such a distributed data processing environment in order to provide a context for the description of the embodiments of the present invention herein below.

Figure 1:
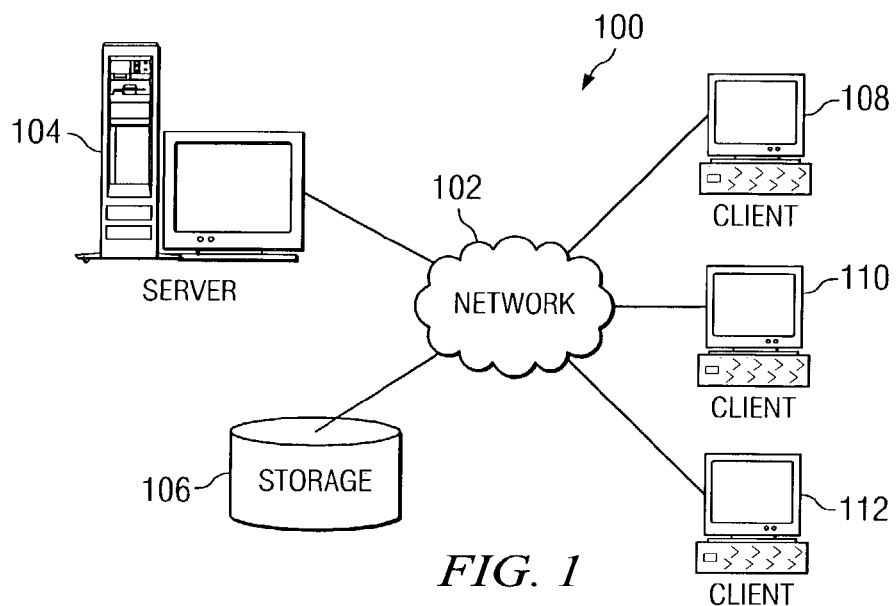
FIG. 1 is an exemplary diagram of a distributed data processing system in accordance with the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
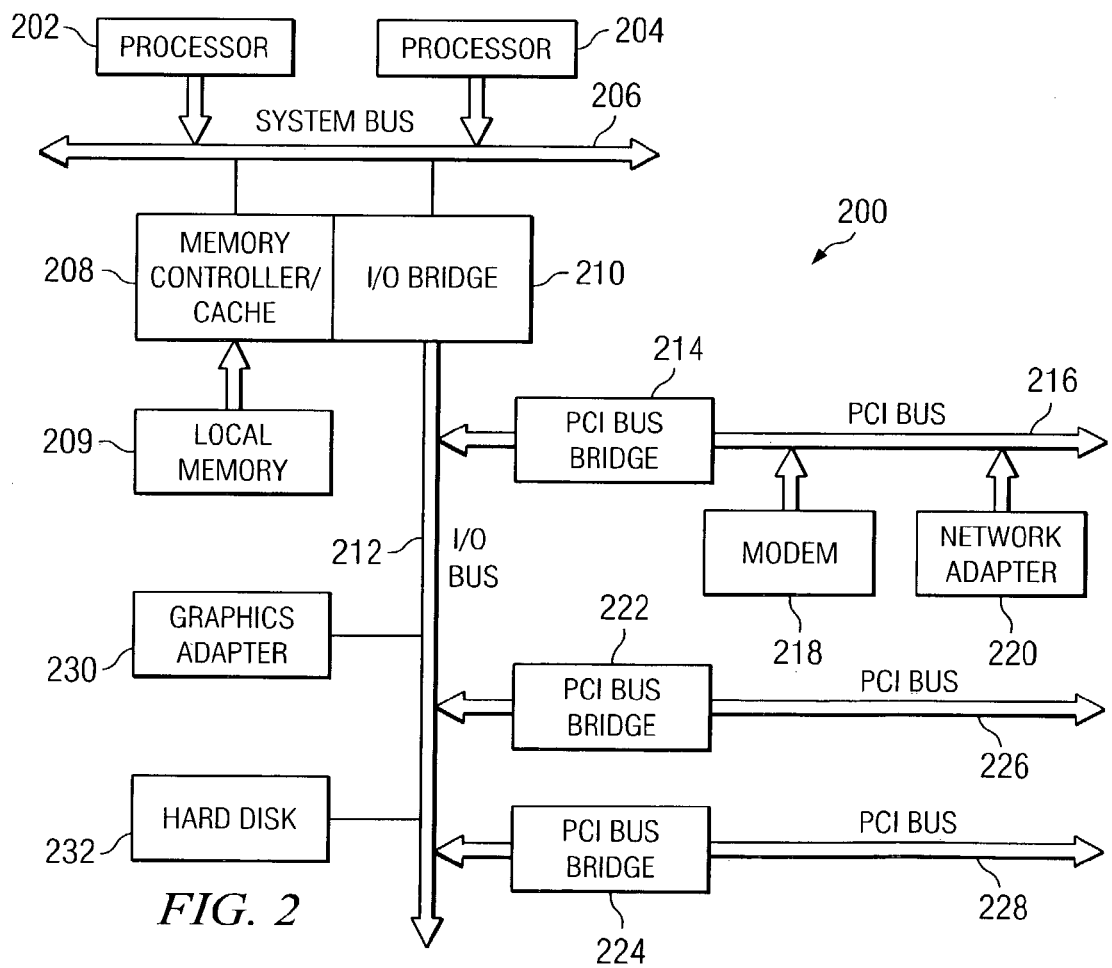
FIG. 2 is an exemplary diagram of a server computing device in accordance with the present invention.
Figure 3:
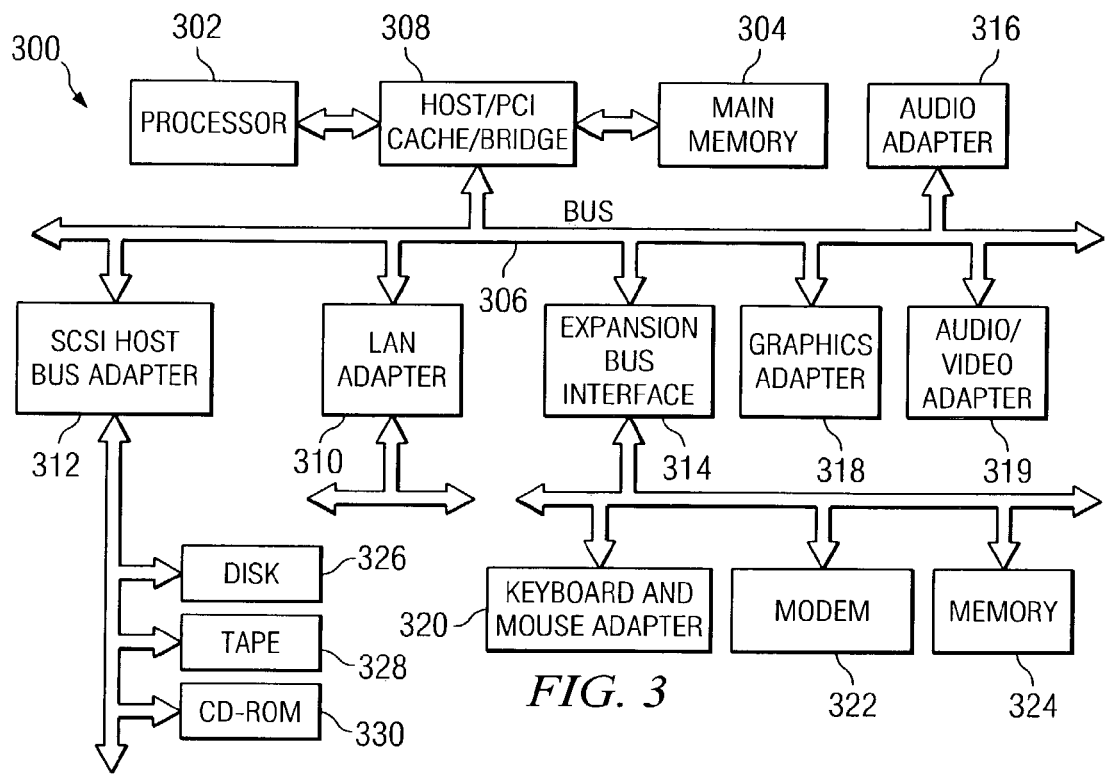
FIG. 3 is an exemplary diagram of a client computing device in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in, connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, New York, running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Returning again to FIG. 1, with the distributed data processing environment of the present invention, the server 104 is considered to be an operational system, such as a business system, from which operational data is to be moved to a data warehouse, such as storage device 106. The operational data may be any type of data that is beneficial to store in a data warehouse for business analysis. For example, this operational data may include order information about orders placed by users of client devices 108-112, customer information, marketing information, and the like.

The present invention provides an ETL system that may be integrated into the server 104, the storage device 106, or may be a separate element in the distributed data processing environment. The ETL system performs extraction, transformation and load processes on the operational data of the server 104 such that the operational data may be stored in a structured form in the storage 106 for later analysis and query. The ETL system of the present invention takes a first set of ETL instructions and converts it to a second set of ETL instructions. The second set of ETL instructions are performed in a more efficient manner than the first set of ETL instructions by minimizing the amount of log space and processing time necessary to perform the ETL operations.

For example, a combination SQL statement in the first set of instructions that is performed in a single transaction, may be converted by the mechanisms of the present invention to a set of commands that are performed in multiple transactions. In this way, the log storage requirements and processing time of the set of commands is less than the log storage requirements and processing time of the combination SQL statement. As a result, the set of commands is performed in a more efficient manner than the combination SQL statement.

Figure 4:
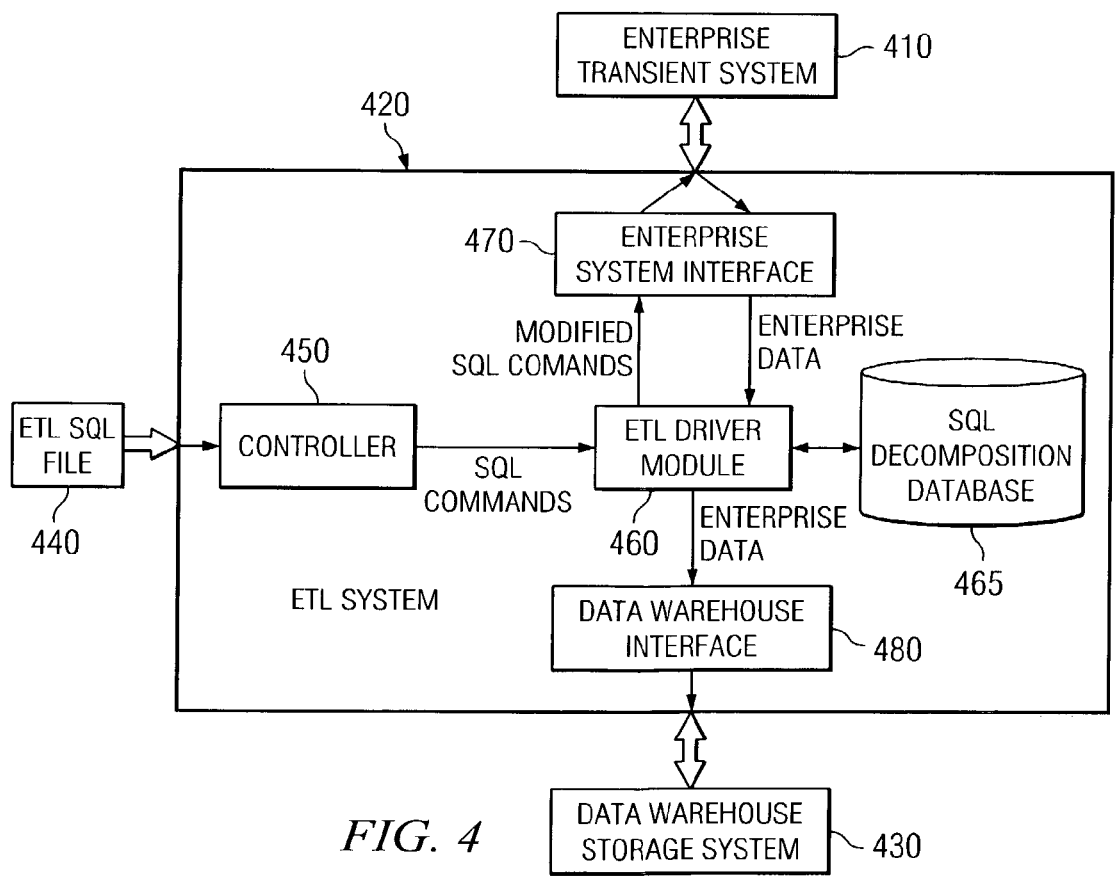
FIG. 4 is an exemplary block diagram illustrating an ETL system in accordance with the present invention.

FIG. 4 is an exemplary block diagram illustrating an exemplary embodiment of the ETL system of the present invention. As shown in FIG. 4, the ETL system 420 of the present invention operates between the enterprise transient system 410, i.e. the operational system, and the data warehouse storage system 430 to take operational data from the enterprise transient system 410 and store it in the data warehouse storage system 430.

The ETL system 420 operates based on an ETL file 440 that includes ETL instructions for extracting, transforming and loading data from the enterprise transient system 410 to the data warehouse storage system 430. The ETL file 440, in a preferred embodiment, is a SQL file that contains one or more SQL statements or instructions. These SQL statements are for accessing and/or manipulating operational data in the enterprise transient system 410 and moving the transformed data into the data warehouse storage system 430. In addition, the ETL file 440, hereafter referred to as the ETL SQL file 440, further includes one or more tags defined by the present invention. These tags identify the manner by which the SQL statements or instructions are to be executed with the enterprise transient system 410. These tags may contain variables that define parameters for the execution of the enterprise transient system 410.

The tags, in a preferred embodiment, are made part of comments in the ETL SQL file 440. Since they are in comments, known mechanisms will ignore the tags present in the comments such that the known mechanisms may execute and test the ETL SQL file 440 under a command line environment. However, in accordance with the present invention, a driver mechanism is provided in the ETL system 420 that parses such comments to determine what tags and tag parameters are present in the comments in order to determine how to execute the SQL instructions in the ETL SQL file 440.

An example of a portion of an ETL SQL file is provided below and is identified as a plurality of examples of portions of an ETL SQL file having and not having command tags associated with them:

```
----- Example 1: Global Command
---- commit after executing each statement
--G-- <CommitStatement> true </CommitStatement>
```

-continued

```
----- Example 2: query without command tag.
insert into wcaetl.test2 (p1,a1,a2,a3)
(select
    p1, a1, a2, a3
 from
    wcaetl.test3
  where p1=1
);
----- Example 3: LoadInsert
--L-- <LoadInsert>
--L--    <LoadOption> load </LoadOption>
--L-- </LoadInsert>
insert into wcaetl.test2 (p1,a1,a2,a3)
(select
    p1, a1, a2, a3
 from
    wcaetl.test3
  where p1 <> 1
);
----- Example 4: CursorInsert with UpdateSource
--L-- <CursorInsert>
--L--    <CommitRows> 1000 </CommitRows>
--L--    <UpdateSource>
--L--       <SourceTable> iwh.test__r </SourceTable>
--L--       <SourceKeys> p1 </SourceKeys>
--L--    </UpdateSource>
--L-- </CursorInsert>
insert into wcaetl.test2 (p1,a1,a2,a3)
(select
    t1.p1, t1.a1, t2.a2, t2.a3
 from
    iwh.test__r t1, iwh.temp__r t2
 where
    t1.p1=t2.p1
);
----- Example 5: Simple CursorUpdate
--L-- <CursorUpdate>
--L--    <CommitRows> 1000 </CommitRows>
--L--    <PrimaryKeys> p1 </PrimaryKeys>
--L--    <UpdateType> simple </UpdateType>
--L-- </CursorUpdate>
update wcaetl.test2 set (a2,a3) = (100, 't2a3') where
p1<>6;
----- Example 6: Composite CursorUpdate
--L-- <CursorUpdate>
--L--    <CommitRows> 1000 </CommitRows>
--L--    <PrimaryKeys> t1.p1,t1.p2 </PrimaryKeys>
--L--    <SelectPrimaryKeys> t2.p1,t2.p2
</SelectPrimaryKeys>
--L--    <UpdateType> composite </UpdateType>
--L-- </CursorUpdate>
update wcaetl.test1 t1 set (a1,a2) =
(select
    t1.a1, t3.a2
 from
    wcaetl.test2 t2, wcaetl.test3 t3
 Where
    t2.p1=t3.p1 and t2.p2=t3.p3
    t1.p1=t2.p1 and t1.p2=t2.p2 and
    t2.p1>2
)
where (t1.p1,t2.p2) in
    (select t2.p1,t2.p2 from wcaetl.test2
     from wcaetl.test2 t2, wcaetl.test3 t3
     where t2.p1=t3.p1 and t2.p2=t3.p3 and
     t2.p1>2);
```

The tags used by the present invention are illustrated in the above example ETL SQL file portion as comments denoted by the characters --G-- and --L--. The tag identifier --G-- refers to global command tags that apply to all of the SQL statements in the ETL SQL file 440 and the --L-- tag identifier refers to local command tags that apply only to the SQL statements immediately following the tag. The use of these tag identifiers and tags is described in greater detail hereafter.

When the ETL SQL file 440 is invoked to perform ETL on the operational data of the enterprise transient system 410, the ETL SQL file 440 is read and parsed by a controller 450 of the ETL system 420. During such parsing, the tags are identified by the tag identifiers in the ETL SQL file 440. The SQL instructions, command instruction tags and tag parameters are provided to the ETL driver module 460 for the particular enterprise transient system 410. The ETL driver interprets the command instruction tags and tag parameters based on information obtained from the SQL decomposition database 465. Based on the command instruction tags and tag parameters, the ETL driver module 460 decomposes the SQL instructions into modified SQL instructions that may be performed in a more efficient manner. That is combination SQL instructions that are performed as a single transaction are decomposed into a set of modified SQL instructions that are performed as a set of transactions.

The modified SQL instructions are executed on the operational data of the enterprise transient system 410 via the enterprise system interface 470. The resulting extracted operational data is stored in the data warehouse storage system 430 via the data warehouse interface 480. The data is stored in the data warehouse storage system 430 in accordance with the structure of the tables of the data warehouse storage system 430.

The SQL decomposition database 465 stores command instructions in association with recognized command tags. By matching the command tags identified in a SQL file 440 to command tags in the SQL decomposition database 465, associated command instructions may be identified. The command instructions are used in association with the SQL instructions and the command tag parameters by the ETL driver module 460 to generate the modified SQL instructions that are used to perform the ETL operations on the operational data of the enterprise transient system 410.

For a warehouse with multiple data sources and multiple tables, multiple SQL files 440 can be defined for different categories of ETL works. Multiple steps can be defined in the warehouse system use the ETL driver 460. A warehouse scheduler may schedule the execution of these steps in a predefined order to extract data from the Transient System 410 and load the transformed data into the Data Warehouse system 430.

The ETL driver module 460 contains conversion logic for a plurality of different execution operations and command tags. Returning to FIG. 4, in a preferred embodiment, the ETL driver module 460 includes conversion logic for converting cursor insert operations, cursor update operations, export/load insert operations, export/import update operations, and the like. The conversion logic for performing these conversion operations will be described hereafter.

Figure 5:
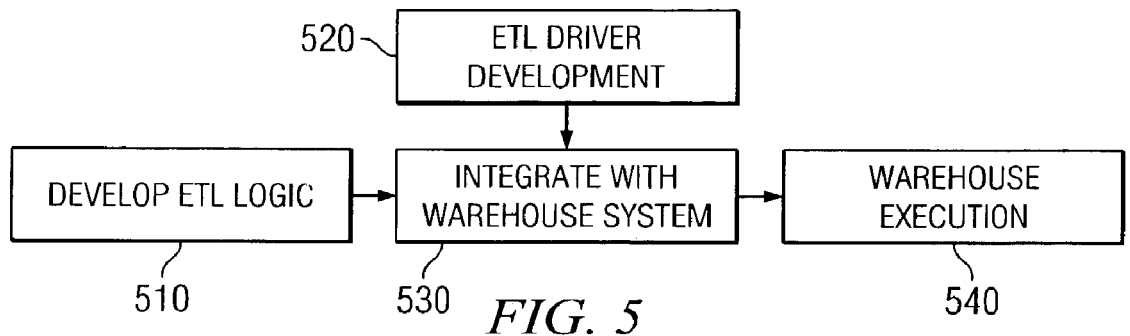
FIG. 5 is a block diagram illustrating the development and integration of the system of the present invention with a data warehouse.

Before operations may be performed to convert SQL statements in an ETL SQL file to a plurality of transactions requiring less log space and providing more efficient execution of the SQL statements, the ETL logic and ETL driver must be developed and integrated into the data warehouse system. FIG. 5 illustrates an exemplary operation for the development and integration of the present invention into a data warehouse system. As shown in FIG. 5, ETL logic 510 is developed and an ETL driver 520 is developed. The ETL logic 510 and ETL driver 520 are then integrated into the data warehouse system 530 which is then able to execute the functionality of the present invention in the data warehouse 540.

The ETL driver 520 has been developed as discussed above with the appropriate functionality for converting combined SQL statements in an ETL SQL file into a plurality of SQL statements that may be performed as a plurality of transactions. Thus, the ETL driver 520 of the present invention is integrated into the data warehouse system by loading the ETL driver 520 into the data warehouse system and registering it with the system registry such that when ETL operations are to be performed, the ETL operations are processed by the ETL driver 520.

Figure 7A:
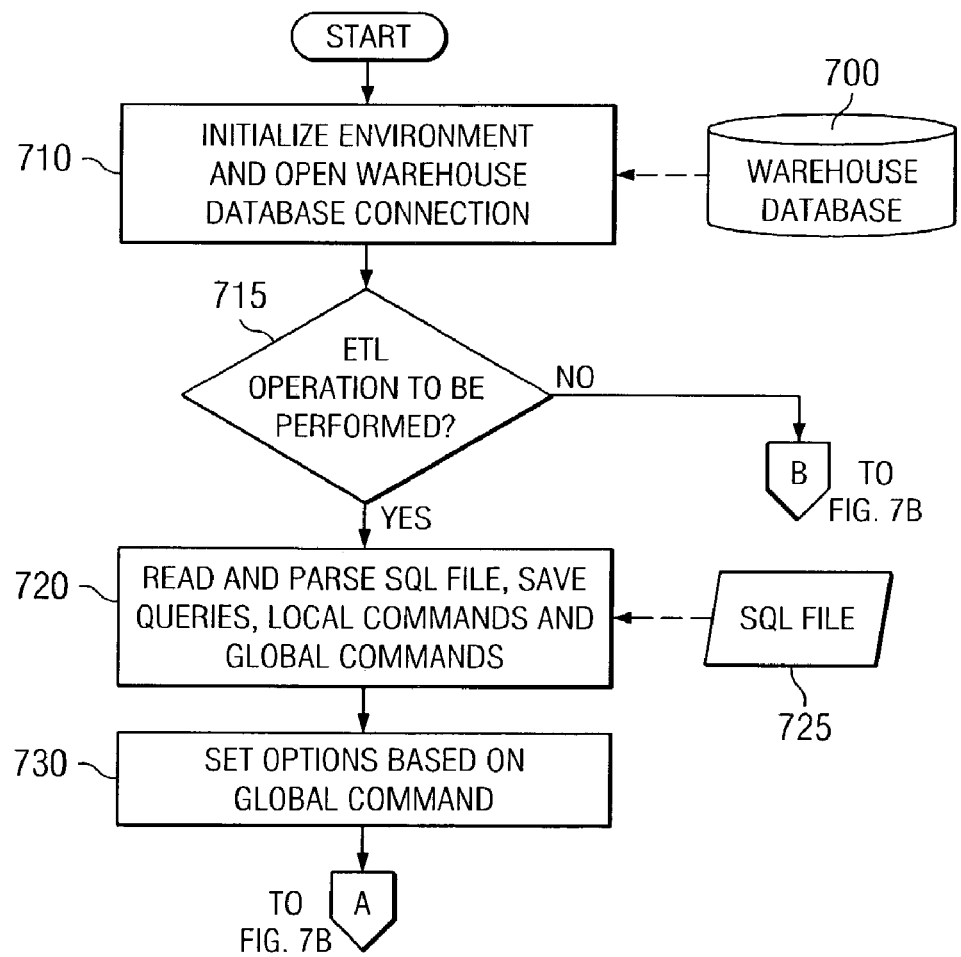
FIGS. 7A and 7B are flowcharts outlining an exemplary operation of the ETL driver according to the present invention.
Figure 7B:
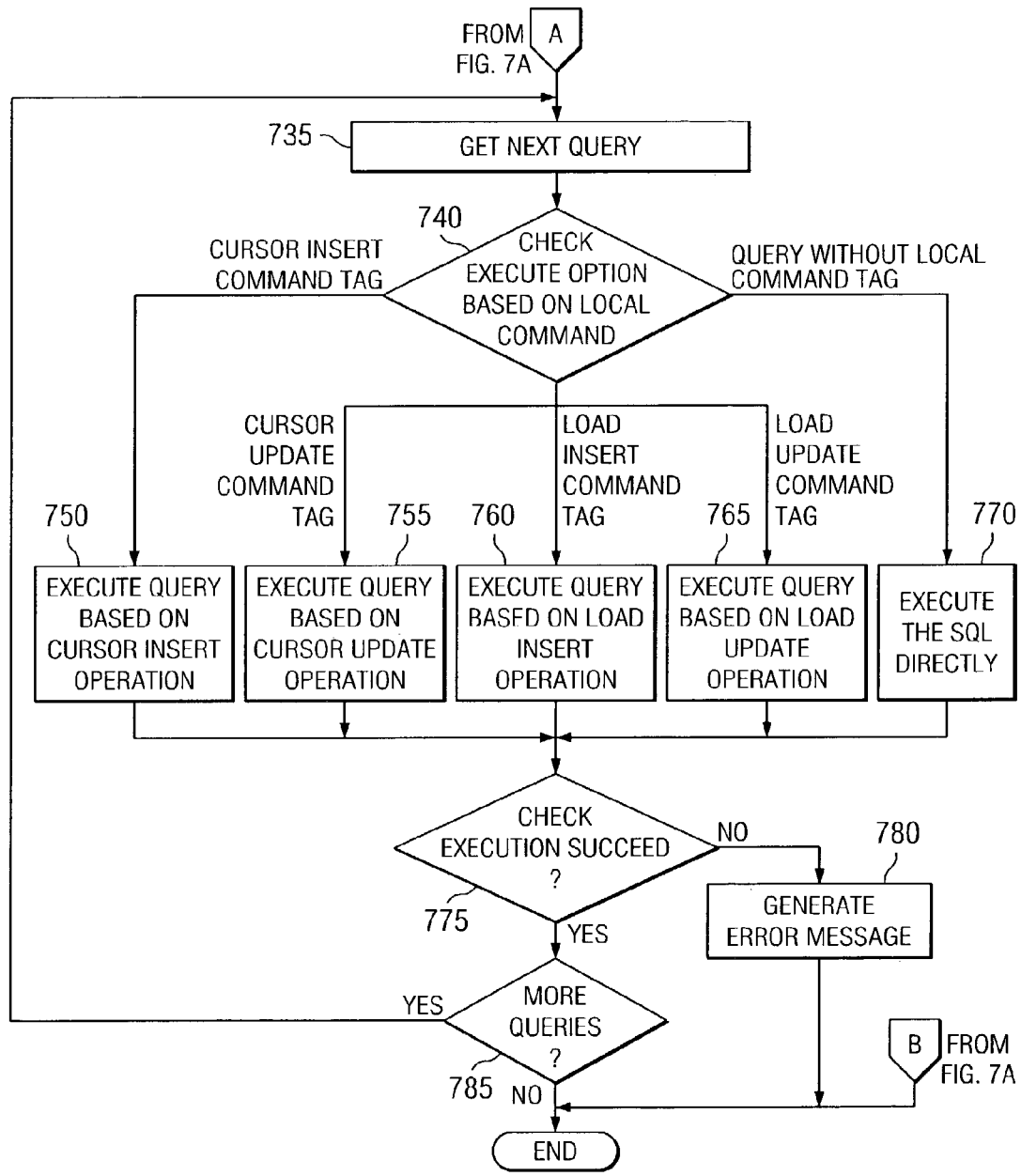

The following are examples that illustrate the results obtained through use of the present invention. The examples illustrate the original SQL statements, the command tags that are used to augment those SQL statements, and the resulting SQL instructions obtained through use of the present invention based on the augmented SQL statements with command tags. The overall logic of how the ETL driver is operated is shown in FIGS. 7A and 7B and will be described in detail later.

In corresponding to the four major categories illustrated above, i.e. cursor insert operations, cursor update operations, export/load insert operations, export/import update operations, four different types of local command tags are defined to provide the conversion instructions for these four major cases. For example, these local command tags may be the CursorInsert command tag for conversion to cursor insert operation with incremental commit, the CursorUpdate command tag for conversion to cursor update operations with incremental commit, the LoadInsert command tag for conversion to insert operations using export/load utilities, and the LoadUpdate command tag for conversion to update operations using export/import utilities. These tags are referred as the local command and defined in XML format.

In a preferred embodiment local command sets are defined in the decomposition database 465 for the following four types of operations, and the DTD definitions of these four local commands are listed in the following:

For insert with cursor:
<!ELEMENT CursorInsert (CommitRows, UpdateSource*)>
<!ELEMENT UpdateSource (SourceTable, SourceKeys, SourceSet*, SourceCondition*)>

For update with cursor:
<!ELEMENT CursorUpdate (CommitRows, PrimaryKeys, UpdateType, SelectPrimaryKeys*, UpdateCondition*)>

For insert with export/load:
<!ELEMENT LoadInsert (LoadOption, LoadParam*)>

For update with export/load:
<!ELEMENT LoadUpdate (LoadOption, PrimaryKeys, UpdateType, SelectPrimarysKeys*, UpdateCondition*, LoadParam*)>

Summaries of the conversion logic associated with CursorInsert, and CursorUpdate are listed in Tables 1, 2, and 3 respectively. Summaries of the conversion logic associated with LoadInsert, and LoadUpdate are listed in Tables 4, 5, and 6 respectively. It is noticed that some of the conversion formats in LoadInsert and LoadUpdate for using export/load utilities are based on DB2 format. However, it is not limited its usage for other databases with such utilities.

For conversion of cursor insert operations, the Insert SQL statement is decomposed into a Select SQL statement and an Insert SQL statement. With the present invention, the ETL driver module 460 executes the Select statement first with the ResultSet generated from the Select statement being fetched one-by-one based on the position of the cursor. The modified Insert statement is generated as PreparedStatement. The fetched data from the selected ResultSet will be inserted into the target table according to the original Insert statement. An incremental commit is performed for every identified number of rows as set by the command tag parameter.

The cursor insert conversion logic is summarized in Table 1 below.

TABLE 1

Cursor Insert Conversion Logic

| | |
|---|---|
| Original Insert Statement T100 | Insert into target_table (target_column_list) (select    source_column_list from    source_table_list where    select_conditions group by    group_by_columns ) |
| Command DTD Definition T110 | <!ELEMENT CursorInsert (CommitRows, UpdateSource*)> <!ELEMENT UpdateSource (SourceTable, SourceKeys, SourceSet*, SourceCondition*)> |
| Local Command Definition T120 | <CursorInsert>    <CommitRows> num_of_rows </CommitRows>    <UpdateSource>       <SourceTable> src_table_name    </SourceTable>       <SourceKeys> srckey1, . . . , srckeym    </SourceKeys>       <SourceSet> src_set_stmt </SourceSet>       <SourceCondition> src_conditions       </SourceCondition>    </UpdateSource> </CursorInsert> |
| Select Query T130 | select    source_column_list from    source_table_list where    select_conditions group by    group_by_columns |
| Insert Query T140 | Insert into target_table (target_column_list) values (?,?, . . . , ?) |
| Update Source Query T150 | Update src_table_name src_set_stmt where    srckey1= ? and . . . and srckeym=?    and src_condition |

As shown above, Table 1 illustrates the document type definition for the cursor insert execution command tag, the local command tag definition for the cursor insert execution command tag, and the SQL queries generated by conversion based on the cursor insert command tag. The SQL queries for the cursor insert command tag include a select query, an insert query, and an update source query (where appropriate) having the format shown in Table 1. The conversion and execution of the decomposed SQL queries will be described in detail hereafter.

In general, the select-insert SQL statement can be expressed in the following illustration form T100. In real cases, more general select statement with other clauses can be used to this type of SQL statements. The form in Table 1 and in other Tables later is only provided for the illustration purpose.

The general DTD command definition for CursorInsert is summarized in T110. The XML form of the CursorInsert command is listed in T120. Based on the provided local command tag, the select-insert query T100 will be decomposed to a Select query T130 for fetching data from the data source and an Insert query T140 for inserting data into the data target in cursor insert mode with incremental commit.

For the case where the UpdateSource tag is provided, additional Update query T150 for updating the data source will be generated.

Figure 8:
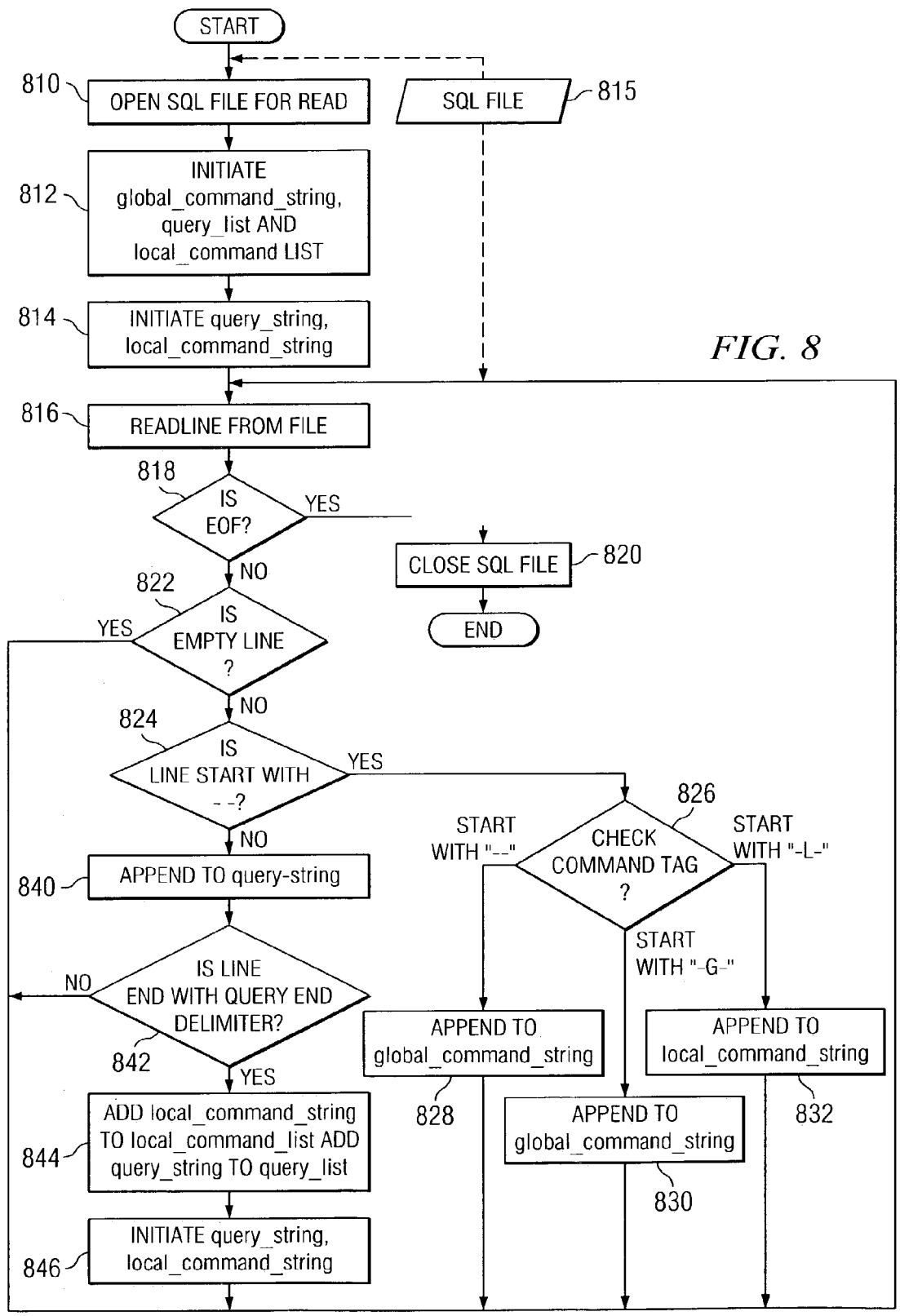
FIG. 8 is a flowchart outlining exemplary logic for parsing command tags and queries in an ETL SQL file.

The conversion logic of how to make use the information in Table1 for conversion and execution is shown in FIG. 8. The pseudocode for this conversion of a cursor insert execution option is as follows:

```
Decompose the statement based on the defined tag
    Generate the Select query
    Generate the Insert query
Prepare a PreparedStatement using Insert query
Execute the Select query
For each row in the selected ResultSet
    Fetch the record from the ResultSet
    Set the value to the PreparedStatement
    Execute the PreparedStatement to finish Insert
    if the num_of_rows
        Commit the transactions
end for
Commit transactions
```

To support error recover, the cursor insert also supports the option to update a source table while the insert is performed. In this case, an additional update statement is generated based on the additional tag and this update statement is executed after a record is inserted. The modified execution logic is as follows:

```
Decompose the statement based on the defined tag
    Generate the Select query
    Generate the Insert query
    Generate Update source query
Prepare a PreparedStatement using Insert query
Prepare a PreparedStatement using update source query
Execute the Select query
For each row in the selected ResultSet
    Fetch the record from the ResultSet
    Set the value to the PreparedStatement for Insert
    Execute the PreparedStatement to finish Insert
    Set the value to the PreparedStatement for Update
        source
    Execute the PreparedStatement to finish Update source
    if the num_of_rows
        Commit the transactions
end for
Commit transactions
```

As an example of how the present invention decomposes a combination SQL statement into multiple transaction SQL statements in the manner discussed above, consider the following sample SQL Select-Insert statement as it is specified in T100:

```
Insert into target_table (target_column_list)
(select
    source_column_list
    Docket No. AUS920030100US1
    from
        source_table_list
    where
        select_conditions
    group by
        group_by_columns
)
```

With the present invention, command tags are added to this SQL statement so that the present invention may decompose this SQL statement into multiple transaction SQL statements.

For example, the following command tags may be added to the above SQL statement for performing cursor insert operations with the SQL statement:

```
<CursorInsert>
    <CommitRows> num_of_rows </CommitRows>
</CursorInsert>
```

Where CommitRows command tag takes the form of:

<CommitRows>num_of_rows </CommitRows> and num_of_rows is the number of rows processed before an incremental commit is performed. This command is applied to all cursor insert and cursor update operations.

As can be seen from the above, the command tags, in a preferred embodiment, take the form of XML tags, although this is not required for the functioning of the present invention. To the contrary, the present invention may be performed with command tags of different formats.

With the present invention, the above SQL statement augmented with the above command tags is parsed by the SQL driver module and decomposed into the following SQL instructions based on the format defined in T130 and T140:

```
SELECT (T130):
    select
        source_column_list
    from
        source_table_list
    where
        select_conditions
    group by
        group_by_columns
INSERT (T140):
    Insert into target_table (target_column_list)
        values (?,?, ... , ?)
```

Now assume that the SQL statement above is further augmented to contain the default UpdateSource tag in order to perform an update of the data source during the Insert operation above. The default UpdateSource tag as it is specified in T120 is illustrated below:

```
<CursorInsert>
    <CommitRows> num_of_rows </CommitRows>
    <UpdateSource>
        <SourceTable> src_table_name </SourceTable>
        <SourceKeys> srckey1, ... , srckeym </SourceKeys>
    </UpdateSource>
</CursorInsert>
``` where the UpdateSource tag is a special tag used for updating the source information during a cursor insert operation. The UpdateSource command tag contains the tags of SourceTable, SourceKeys in this example. The SourceTable tag takes the form:

<SourceTable> src_table_name </SourceTable> where the src_table_name is the name of the table where the source information is to be updated. This command is used in the UpdateSource tag for CursorInsert SQL statements as the part of the UpdateSource tag.

The SourceKeys command tag takes the form:

```
<SourceKeys> srckey1, srckey2, . . . , srckeym
</SourceKeys>
``` where the srckey1, srckey2 . . . , srckeym are a list of comma delimited column names which can uniquely identify the rows in the source table to be updated.

The default update source SQL instructions generated based on such a command tag associated with the SQL statement will use an internally defined source set of statement and source update conditions, such as:

Update src_table_name set load_status='Y'
   where load_status is null and
     ibmanap_operations='I' and
     srckey1=? and . . . and srckeym=?

Rather than the default update source command tag discussed above, a full UpdateSource tag defined in T120 may be utilized as follows:

```
<CursorInsert>
    <CommitRows> num_of_rows </CommitRows>
    <UpdateSource>
        <SourceTable> src_table_name </SourceTable>
        <SourceKeys> srckey1, . . . , srckeym </SourceKeys>
        <SourceSet> src_set_stmt </SourceSet>
        <SourceCondition> src_conditions
            </SourceCondition>
    </UpdateSource>
</CursorInsert>
```

The SourceSet command tag takes the form:
   <SourceSet> src_set_stmt </SourceSet>
where the src_set_stmt is the set statement used in the Update SQL statement for updating source table information. This is an optional tag that, if not provided, has the following default statement used:
   Set load_status='Y'

The SourceCondition command tag takes the form:
   <SourceCondition> src_conditions </SourceCondition>
where the src_conditions are the conditions used in the Update SQL statement as the conditions in the "where" clause for updating the source table information. This is an optional tag that, if not provided, has the following default statement:
   load_status is null and ibmsnap_operations='I'

This command tag may be used in CursorInsert operations for the INSERT SQL statement as part of the UpdateSource tag. The resulting update source SQL instructions are generated by the present invention as:

Update src_table_name set src_set_stmt
   where src_conditions and
     srckey1=? and . . . and srckeym=?

In addition to the above, the preferred embodiment of the present invention further includes conversion logic for converting Cursor Update SQL statements into a plurality of SQL transactions. For the cursor update operations, the update is decomposed into a Select statement and an Update statement. The ETL driver executes the Select statement first with the ResultSet generated from the Select being fetched one-by-one based on the position of the cursor. The modified Update instruction is prepared as PreparedStatement. The fetched data from the selected ResultSet is updated to the target table by the PreparedStatement. An incremental commit may be performed for every designated number of rows as defined in the CommitRows tag.

Based on how the update is performed, the update statements are classified into two different categories, simple update and composite update. The simple update statement operates on the target table only to update the information in the target table with a specific set of values. Simple update is a type of update only statement. The composite update statement updates the information in the target table with the information selected from the source table. Composite update is a type of select-update statement. In the defined CursorUpdate tag, the UpdateType element is defined to specify the type of update statements it refers to.

The cursor update conversion logic is summarized in Tables 2 and 3 below.

As shown below, Tables 2 and 3 illustrates the document type definition for the cursor update execution command tag, the local command tag definition for the cursor update execution command tag, and the SQL queries generated by conversion based on the cursor update command tag. The SQL queries for the cursor update command tag include a select query and an update query having the format shown in Tables 2 and 3. The conversion and execution of the decomposed SQL queries will be described in detail hereafter.

TABLE 2

| | CursorUpdate Conversion Logic for Simple |
|---|---|
| Original Update Statement T200 | Update target_table_name<br>set<br>  (target_column_list) = (target_value_liste)<br>Where<br>  Simple_Update_conditions |
| Command DTD Definition T210 | <!ELEMENT CursorUpdate (CommitRows, PrimaryKeys, UpdateType)> |
| Local Command Definition T220 | <CursorUpdate><br>  <CommitRows> num_rows </CommitRows><br>  <PrimaryKeys> key1, . . . , keym </PrimaryKeys><br>  <UpdateType > simple </UpdateType ><br></CursorUpdate> |
| Select Query T230 | select<br>  key1, . . . , keym<br>from<br>  target_table_name<br>where<br>  simple_update_conditions |
| Update Query T240 | Update target_table_name<br>set<br>  (target_column_list) = (target_value_list)<br>where<br>  key1=?, . . . , keyn=? |

Update Query

TABLE 3

| | CursorUpdate Conversion Logic for Composite Update Query |
|---|---|
| Original Update Statement T300 | Update target_table_name tb_alias<br>set (target_column_list) =<br>  ( Select<br>     source_column_list<br>  From<br>     source_table_list<br>  Where<br>     table_join_conditions and<br>     update_join_conditions and<br>     other_select_conditions |

TABLE 3-continued

CursorUpdate Conversion Logic for Composite Update Query

|  |  |
|---|---|
|  | Group by |
|  |     group_columns |
|  | ) |
|  | Where |
|  |     other_update_conditions |
| Command DTD Definition T310 | <!ELEMENT CursorUpdate (CommitRows, PrimaryKeys, UpdateType, SelectPrimaryKeys*, UpdateCondition*)> |
| Local Command Definition T320 | <CursorUpdate><br>   <CommitRows> num_rows </CommitRows><br>   <PrimaryKeys> key1, . . . , keym<br>   </PrimaryKeys><br>   <SelectPrimaryKeys> skey1, . . . , skeym<br>   </SelectPrimaryKeys><br>   <UpdateCondition> special_update_conditions<br>   </UpdateCondition><br>   <UpdateType> composite </UpdateType><br></CursorUpdate> |
| Select Query T330 | Select<br>   source_column_list, skey1, . . . , skeym<br>From<br>   source_table_list<br>Where<br>   table_join_conditions and<br>   Other_select_conditions<br>Group by<br>   group_columns |
| Update Query T340 | Update target_table_name tb_alias<br>set<br>   (target_column_list) = (?, ?, . . . , ?)<br>where<br>   key1=?, . . . , keym=?<br>   and special_update_conditions |

In general, a simple update SQL statement can be expressed in the following illustration form T200. A composite update SQL statement can be expressed in the following illustration form T300. In real cases, other clauses can be added to this type of SQL statements. The forms in Tables 2 & 3 are only provided for the illustration purpose.

The general DTD command definitions for CursorUpdate are summarized in T210 and T310. The XML form of the CursorUpdate command is listed in T220 and T320. Based on the provided local command tag, the simple update query T200 or composite update query T300 will be decomposed to a Select query T230 or T330 for fetching data from the data source and an Update query T240 or T340 for updating data in the data target in cursor insert mode with incremental commit.

Figure 9:
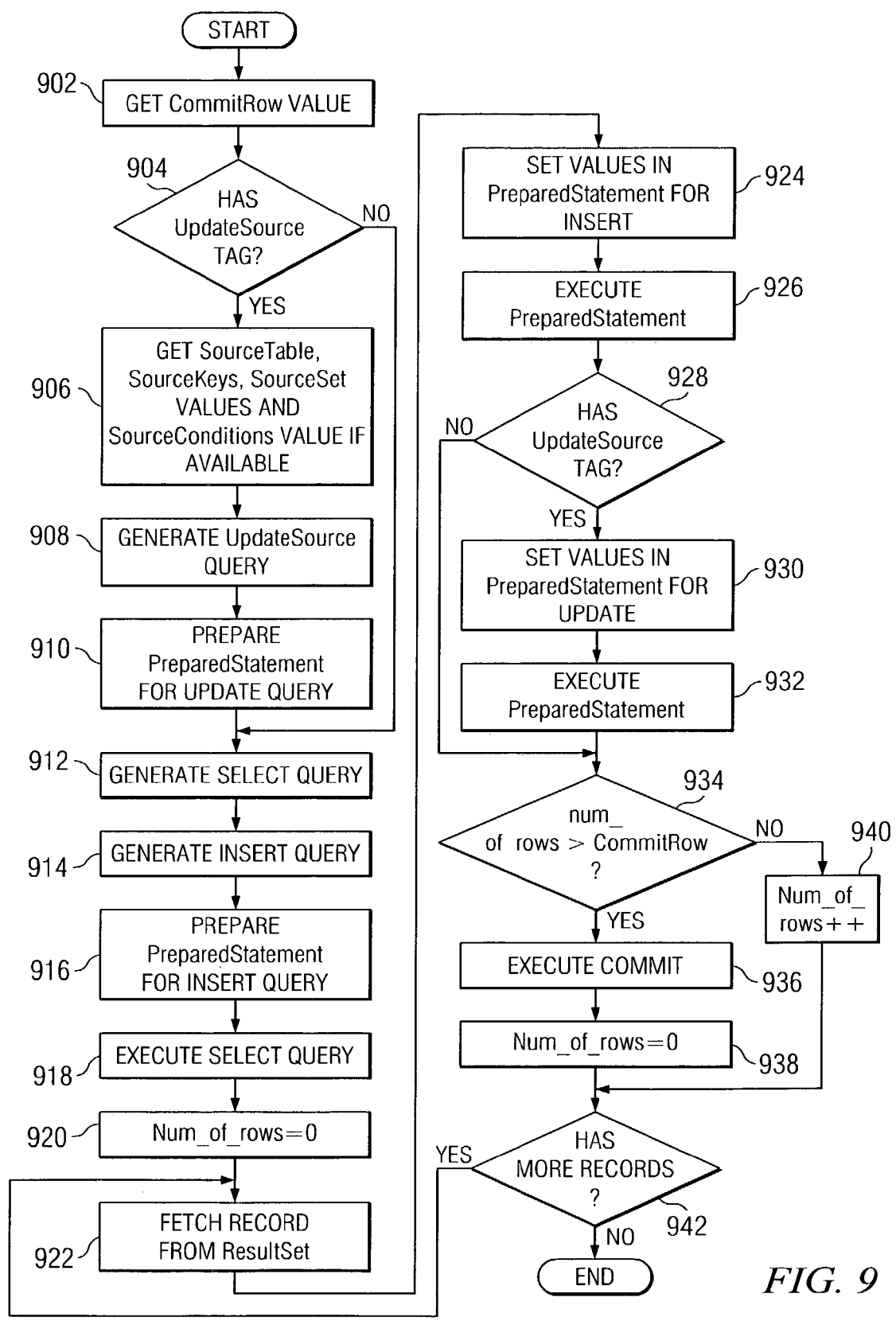
FIG. 9 illustrates exemplary conversion logic operations for converting SQL statements in an ETL SQL file having an associated cursor insert tag in accordance with the present invention.

The conversion logic of how to make use the information in Tables 2 and 3 for conversion and execution is shown in FIG. 9. The pseudocode for performing this conversion is as follows:

Decompose the statement based on the defined tag
   Generate the Select query
   Generate the Update query
Prepare a PreparedStatement using Update query
Execute the Select query
For each row in the selected ResultSet
   Fetch the record from the ResultSet
   Set the value to the PreparedStatement
   Execute the PreparedStatement to finish Update
   If the num_of_rows
      Commit the transactions
End for
Commit transactions The typical simple Select-Update SQL statement has the following format T200:

Update target_table_name
set
   (target_column_list)=(target_value_liste)
Where
   Simple_Update_conditions The above simple update SQL statement may be augmented by the inclusion of a command tag in accordance with the present invention. An example of a CursorUpdate command tag according to the present invention is as follows:

```
<CursorUpdate>
   <CommitRows> num_of_rows </CommitRows>
   <PrimaryKeys> key1, . . . , keym </PrimaryKeys>
   <UpdateType> simple </UpdateType>
</CursorUpdate>
```

Additional local command tags that may be used with the preferred embodiment of the present invention in this case include the PrimaryKeys command tag which takes the form:

```
<PrimaryKeys> key1, key2, . . . , keym
</PrimaryKeys>
``` where key1, key2 . . . , keym is a list of comma delimited column names which can uniquely identify the rows in the table to be updated. This command tag is used for UPDATE SQL statements. If the list of the keys is the same as what is listed in the PrimaryKey list, this command tag may be omitted.

Another supported local command tag is the UpdateType command tag which takes the form:

<UpdateType> type_of_update_sql </UpdateType> where the type_of_update_sql carries one of two values "simple" and "composite". For the simple update case, the UpdateType tag carries the value of "simple". The decomposed SQL instructions obtained through the use of the present invention are:

```
SELECT T230:
   select
      key1, . . . , keym
   from
      target_table_name
   where
      simple_update_conditions
INSERT 240:
   Update target_table_name
   set
      (target_column_list) = (target_value_list)
   where
      key1=?, . . . , keyn=?
```

As a further example, the typical Select-Update statement for a composite cursor update T300 has the following format:

```
Update target_table_name tb_alias
set (target_column_list) =
(
  Select
     source_column_list
  From
     A_source_table
  Where
     update_join_conditions and
     other_select_conditions
  Group by
     group_columns
)
Where
     other_update_conditions
```

The update_join_conditions are the conditions where the columns from the select-result set join with the columns in the update statement. The values of these columns are registered in the PrimaryKeys. The other_select_conditions are the other conditions that may exist in the select statement. It is expected that the sub-set generated from the select statement with the effective_other_select conditions are the same as the one generated with the update_conditions used in the update statement.

If the tag for the default CursorUpdate is defined as:

```
<CursorUpdate>
  <CommitRows> num_rows </CommitRows>
  <PrimaryKeys> key1, . . . , keym </PrimaryKeys>
  <UpdateType> composite </UpdateType>
</CursorUpdate>
```

The above command tag assumes the column names of the key list from the Select query are the same as the Update query. Usually, it can be used for select data from a single source table.

The more general SQL Select-Update statement can have the following format:

```
Update target_table_name tb_alias
set (target_column_list) =
(
  Select
     source_column_list
  From
     source_table_list
  Where
     table_join_conditions and
     update_join_conditions and
     other_select_conditions
  Group by
     group_columns
)
Where
     other_update_conditions
```

The update_join_condition are the conditions where the columns from the select-result set join with the columns in the update statement. The values of these columns are registered in the PrimaryKeys and SelectPrimaryKey tags. The order of the key column listing reflects the mapping in this join condition skey1=key1 and . . . and skeym=keyn The table_join_condition are the conditions where multiple tables are joined together in the select statement. It is expected that the sub-set generated from the select statement with the effective other_select_conditions are the same as the one generated with the update_conditions used in the update statement. If there are extra conditions applied to the update statement for a smaller sub-set, these update conditions are considered as the special_update_conditions.

The command tag for the general CursorUpdate is defined as:

```
<CursorUpdate>
  <CommitRows> num_rows </CommitRows>
  <PrimaryKeys> key1, . . . , keym
  </PrimaryKeys>
  <SelectPrimaryKeys> skey1, . . . , skeym
  </SelectPrimaryKeys>
  <UpdateCondition> special_update_conditions
  </UpdateCondition>
  <Option> composite </Option>
</CursorUpdate>
```

Another supported local command tag is the SelectPrimaryKeys command tag which takes the form:

```
<SelectPrimaryKeys> skey1, skey2, . . . , skeym
</SelectPrimaryKeys>
``` where skey1, skey2, . . . , keym is a list of comma delimited column names which can uniquely identify the rows from the table where the Select operation is executed. This command tag is used with the CursorUpdate tag to specify a set of primary keys in the select SQL. In conjunction with the set of primary keys specified for the target table in the PrimaryKey tag, the CursorUpdate tag will be used to eliminate the update_join_conditions in the conversion. If the list of the keys is the same as what is listed in the PrimaryKey list, this command tag may be omitted.

Another local command tag that is supported by the preferred embodiment of the present invention is the UpdateCondition command tag which takes the form:

```
<UpdateCondition> special_upd_conditions
</UpdateCondition>
``` where the special_upd_conditions are the additional conditions which are added on the update statement after the statement is decomposed. The regular equal conditions on the key columns as listed in PrimaryKeys are added automatically. This is used for special conditions and the conditions listed here will be appended to the regular conditions.

Based on this command tag and the general Select-Update SQL statement is decomposed by the present invention into the following SQL instructions:

```
SELECT T330:
  Select
     source_column_list, skey1, . . . , skeym
  From
     source_table_list
```

-continued

```
Where
    table_join_conditions and
        Other_select_conditions
    Group by
        group_columns
UPDATE T340:
    Update target_table_name tb_alias
    set
        (target_column_list) = (?, ?, . . . , ?)
    where
        key1=?, . . . , keym=?
        and special_update_conditions
```

For the export/load operation, the present invention decomposes the Insert into a Select statement and an Insert statement. The ETL driver mechanism 460 generates an Export command using the decomposed Select statement and a corresponding Load or Import statement is generated using the Insert statement. An external script is generated which contains the database connection, commands and error check. The ETL driver mechanism 460 executes this external program to complete the export/load operations.

The load insert conversion logic is summarized in Table 4 below.

TABLE 4

Load Insert Conversion Logic

| | |
|---|---|
| Original Insert Statement T400 | Insert into target_table (target_column_list) (select    source_column_list from    source_table_list where    select_conditions group by clause ) |
| Command DTD Definition T410 | <!ELEMENT LoadInsert (LoadOption, LoadParam*)> |
| Local Command Definition T420 | <LoadInsert>    <LoadOption> load_option </LoadOption>    <LoadParam> load_parameters </LoadParam> </LoadInsert> |
| Select Query T430 | select    source_column_list from    source_table_list where    select_conditions group by clause |
| Insert Query T440 | Insert into target_table (target_column_list) |
| Export Command T450 | export to export_file_name of ixf messages exp_msg_file_name (Select Query) |
| Load Command T460 | load from export_file_name of ixf messages load_msg_file_name (Insert Query) for exception except_table_name |

As shown above, Table 4 illustrates the document type definition for the load insert execution command tag, the local command tag definition for the load insert execution command tag, and the SQL queries/commands generated by conversion based on the load insert command tag. The SQL queries for the load insert command tag include a select query, an insert query, an export command and a load command having the format shown in Table 4.

The general DTD command definition for LoadInsert is summarized in T410. The XML form of the LoadInsert command is listed in T420. Based on the provided local command tag, the select-insert query T400 will be decomposed to a Select query T430 for fetching data from the data source and an Insert query T440 for inserting data into the data target. The export command T450 will be generated according to the select query T430 and the load/import command T460 will be generated according to the insert query T440.

Figure 10:
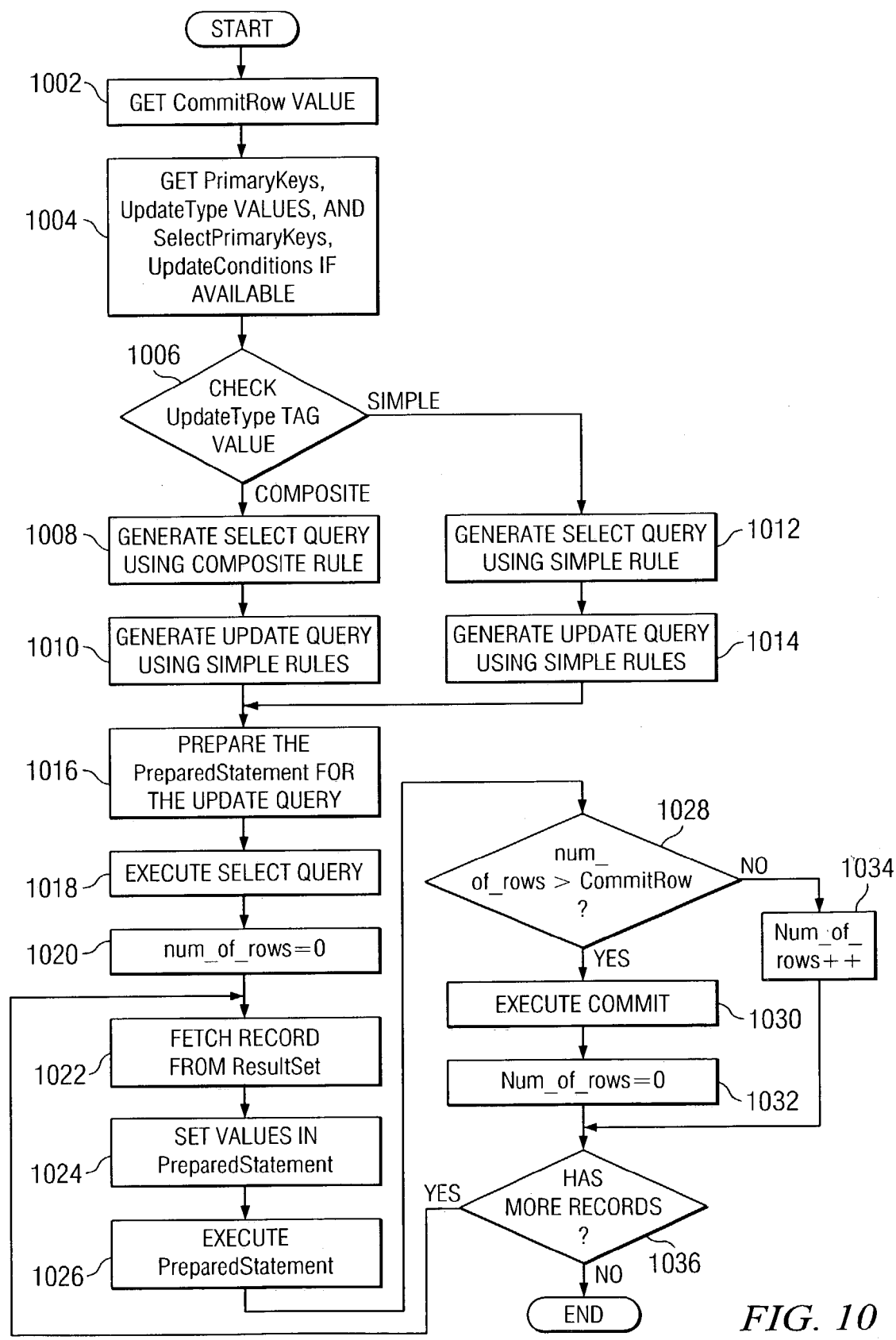
FIG. 10 illustrates exemplary conversion logic operations for converting SQL statements in an ETL SQL file having an associated cursor update tag in accordance with the present invention.

The conversion logic of how to make use of the information in Table 4 for conversion and execution is shown in FIG. 10. The following is pseudocode for the main conversion logic of the present invention with regard to a load insert execution option of a command tag:

Decompose the statement based on the defined tag
        Generate the Select query
        Generate the Insert query
    Compose the export command using the Select query
    Compose the load/import command using the Insert query
    Generate the external script and write to a external file
    Change the script to have executive permission as needed
    Execute the execute external script
    Check the execution error and end with proper condition The typical Select-Insert SQL statement has the following format:

```
Insert into target_table (target_column_list)
(select
    source_column_list
from
    source_table_list
where
    select_conditions
group by
    group_by_columns
)
```

The default LoadInsert tag takes the form of:

```
--L--  <LoadInsert>
--L--      <LoadOption> load </LoadOption>
--L--  </LoadInsert>
```

Here another local command tag that is supported by the preferred embodiment of the present invention is the LoadOption command tag which takes the form:

<LoadOption> load_option </LoadOption> where load_option carries one of two values "import" and "load". With this command, the SQL statement is decomposed into a Select SQL instruction and an Insert SQL instruction. The Select SQL instruction is executed with an 'Export' command and exports the selected result into a external file. The Insert SQL instruction is executed by an 'Import' or 'Load' command based on the given option.

A further local command tag that is supported by the preferred embodiment of the present invention is the LoadParam command tag that takes the form:

<LoadParam> load_parameters </LoadParam> where load_parameters carries parameters set by a 'modified by' command in an Import or Load command. Exact parameters vary based on the import or load command.

The generated Export and Load SQL instructions generated by the present invention are:

EXPORT T450:
    export to export_file_name of ixf messages
    exp_msg_file_name (Select Query)

where, the Select Query is generated according to the format specified in T430.

LOAD T460:
 load from export_file_name of ixf messages
 load_msg_file_name (Insert Query) for exception
 except_table_name where export_file_name is the file where the exported data is to be stored. Except_table_name is the name of the exception table in which invalid data is to be stored. Select Query and Insert Query will be generated according to the format specified in T430 and T440.

exp_msg_file name and load_msg_file_name are the message files containing export and load messages respectively.

For an export/import operation, the present invention decomposes the Update statement into a Select statement and an Insert statement. The ETL driver mechanism 460 generates an Export command using the decomposed Select statement, a corresponding Import statement is generated using the Insert statement with the Insert-Update option in the Import command. An external script is generated which contains the database connection, commands and error check. The ETL driver mechanism 460 executes this external program to complete the export/load operations.

The load update conversion logic is summarized in Table 5 below.

TABLE 5

Load Update Conversion Logic for Simple Update Query

| | |
|---|---|
| Original Update Statement T500 | Update target_table_name<br>set<br>  (target_column_list) = (target_value_liste)<br>Where<br>  Simple_Update_conditions |
| Command DTD Definition T510 | <!ELEMENT LoadUpdate (LoadOption, PrimaryKeys, UpdateType, LoadParam*)> |
| Local Command Definition T520 | <LoadUpdate><br>  <LoadOption> import </LoadOption><br>  <PrimaryKeys> key1, . . . , keym </PrimaryKeys><br>  <UpdateType> simple </UpdateType><br></LoadUpdate > |
| Select Query T530 | select<br>  target_column_values, key1, . . . , keym<br>from<br>  target_table_name<br>where<br>  simple_update_conditions |
| Update Query T540 | Insert_update into target_table_name<br>(target_column_list, key1, . . . , keym ) |
| Export Command T550 | export to export_file_name of ixf messages<br>exp_msg_file_name (Select Query) |
| Load Command T560 | import from export_file_name of ixf messages<br>imp_msg_file_name (Insert Query) |

TABLE 6

Load Update Conversion Logic for Composite Update Query

| | |
|---|---|
| Original Update Statement | Update target_table_name tb_alias<br>set (target_column_list) =<br>( Select |

TABLE 6-continued

Load Update Conversion Logic for Composite Update Query

| | |
|---|---|
| T600 |   source_column_list<br>From<br>  source_table_list<br>Where<br>  table_join_conditions and<br>  update_join_conditions and<br>  other_select_conditions<br>Group by<br>  group_columns<br>)<br>Where<br>  other_update_conditions |
| Command DTD Definition T610 | <!ELEMENT LoadUpdate (LoadOption, PrimaryKeys, UpdateType, SelectPrimarysKeys*, LoadParam*)> |
| Local Command Definition T620 | <LoadUpdate><br>  <LoadOption> import </LoadOption><br>  <PrimaryKeys> key1, . . . , keym </PrimaryKeys><br>  <SelectPrimaryKeys> skey1, . . . , skeym<br>  </SelectPrimaryKeys><br>  <UpdateType> composite </UpdateType><br></LoadUpdate > |
| Select Query T630 | Select<br>  source_column_list, skey1, . . . , skeym<br>From<br>  source_table_list<br>Where<br>  table_join_conditions and<br>  Other_select_conditions<br>Group by<br>  group_columns |
| Update Query T640 | Insert_update into target_table_name<br>(target_column_list, key1, . . . , keym ) |
| Export Command T650 | export to export_file_name of ixf messages<br>exp_msg_file_name (Select Query) |
| Load Command T660 | import from export_file_name of ixf messages<br>imp_msg_file_name (Insert Query) |

As shown above, Tables 5 and 6 illustrate the document type definition for the load update execution command tag, the local command tag definition for the load update execution command tag, and the SQL queries/commands generated by conversion based on the load update command tag. The SQL queries for the load update command tag include a select query, an update query, an export command and a load command having the format shown in Tables 5 and 6.

The general DTD command definitions for LoadUpdate are summarized in T510 and T610. The XML form of the LoadInsert command is listed in T520 and T620. Based on the provided local command tag, the simple update query T500 or the composite update query T600 will be decomposed to a Select query T530 or T630 for fetching data from the data source and a Insert-update query T540 or T640 for updating data in the data target. The export command T550 or T650 will be generated according to the select query T530 or T630 and the import command T560 or T660 will be generated according to the insert-update statement T540 or T640.

Figure 11:
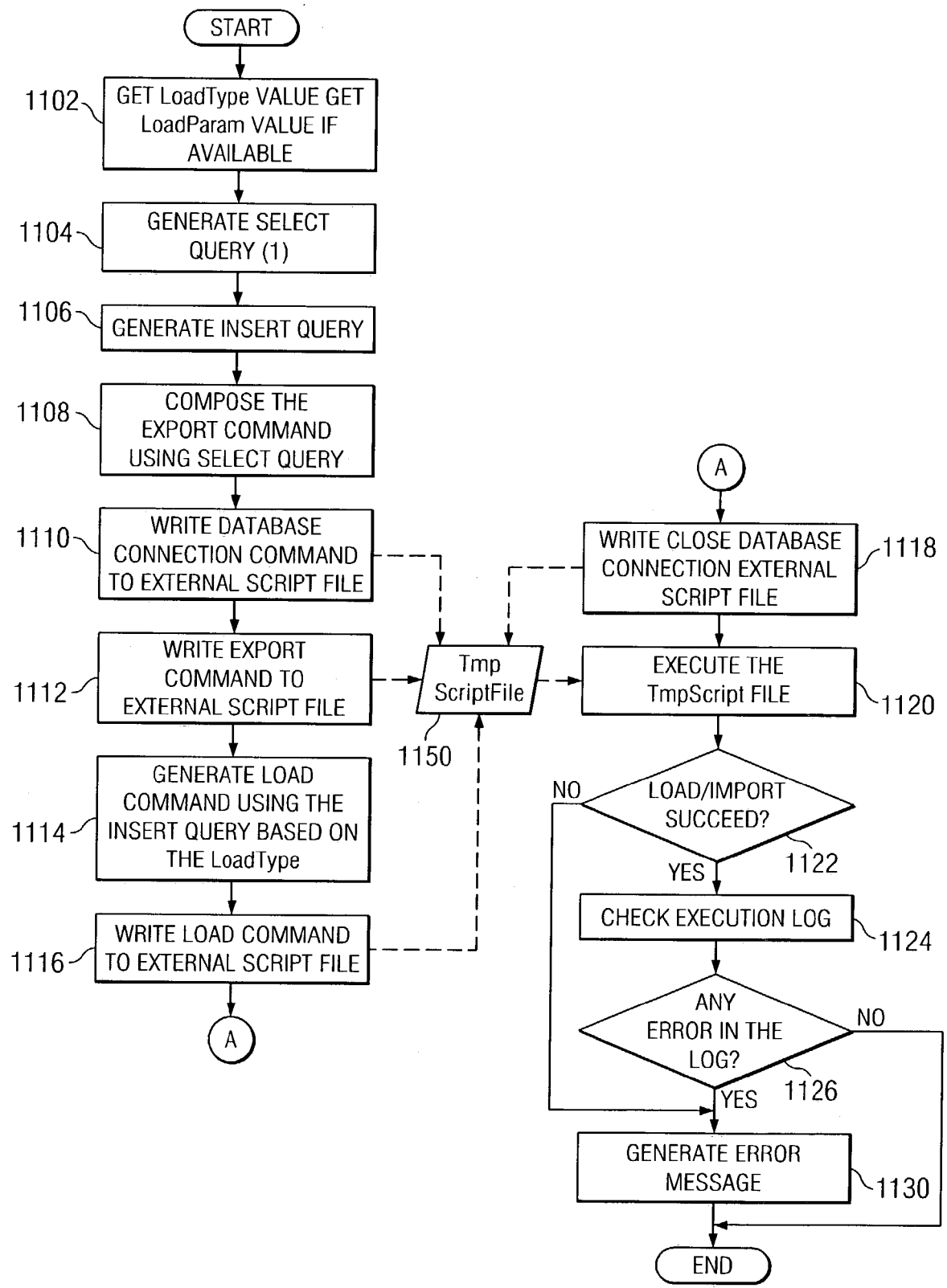
FIG. 11 illustrates exemplary conversion logic operations for converting SQL statements in an ETL SQL file having an associated load insert tag in accordance with the present invention.

The conversion logic of how to make use the information in Tables 5 and 6 for conversion and execution is shown in FIG. 11. The main conversion logic for a load update is as follows:
 Decompose the statement based on the defined tag
  Generate the Select query
  Generate the Insert query
 Compose the export command using the Select query
 Compose the load/import command using the Insert query Generate the external script and write to a external file
Change the script to have executive permission as needed
Execute the execute external script
Check the execution error and end with proper condition The typical simple SQL Select-Update statement takes the form specified in T500. The simple update statement may be augmented with the following command tag for the CursorUpdate:

```
--L-- <LoadUpdate>
--L--    <LoadOption> import </LoadOption>
--L--    <PrimaryKeys> key1, . . . , keym
         </PrimaryKeys>
--L--    <UpdateType> simple </UpdateType>
--L-- </LoadUpdate>
```

The columns listed in PrimaryKeys tag, key1, . . . , keym, are the primary keys or a part of the primary key.

The generated Export and Import commands produced by operation of the present invention are:
EXPORT T550:
   export to export_file_name of ixf messages
   exp_msg_file_name (Select Query)
IMPORT T560:
   import from export_file_name of ixf messages
   imp_msg_file_name (Update Query)

where export_file_name is the file where the exported data is to be stored. Select Query and Update Query will be generated according to the format specified in T530 and T540.

For composite export/import update operations, the general composite Select-Update statement takes the form as it is specified in T600. The above SQL export/update statement may be augmented with the following command tag for the general CursorUpdate:

```
<LoadUpdate>
   <LoadOption> import </LoadOption>
   <PrimaryKeys> key1, . . . , keym
   </PrimaryKeys>
   <SelectPrimaryKeys> skey1, . . . , skeym
   </SelectPrimaryKeys>
   <Option> composite </Option>
</LoadUpdate>
```

Based on this command tag and the above export/update SQL statement, the present invention generates the following Export/Import commands:
EXPORT:
   export to export_file_name of ixf messages
   exp_msg_file_name (Select Query)
IMPORT:
   import from export_file_name of ixf messages
   imp_msg_file_name (Insert Query)

where export_file_name is the file where the exported data is to be stored. Select Query and Update Query will be generated according to the format specified in T630 and T640.

As illustrated in the above examples, command tags and corresponding commands are established for converting the SQL statements into modified SQL instructions that are performed as a plurality of transactions. These command lags and corresponding commands take two different forms: global commands and local commands. The global commands apply to all SQL statements defined in a given SQL file 440. Global command tags usually set the global information needed to control the execution of all queries in the SQL file and control the state of the database. The global command tags are identified by the string "--G--". The local commands tags only apply to the SQL statement with which they are associated.

The local command tag is inserted before the SQL statement to which it applies. Local command tags provide the command instructions on how the query will be converted for more efficient execution. The local commands are identified by the text string "--L--". These strings are used by this invention as the example for all descriptions here. However, the present invention is not limited to the use of these particular strings and any command tag identifier may be used, as long as the implementation of the ETL can recognize the specified command tag identifier, without departing from the spirit and scope of the present invention.

In a preferred embodiment of the present invention, the following global commands are supported. The first global command is the commitstatement:
   <CommitStatement> commit_option </CommitStatement> where to commit_option carries values of "true" or "false." This global command overrides the flag passed in from the command line. If it is set to 'true', the ETL driver mechanism 460 commits the transaction after execution of each SQL statement. An example of this command with a global command tag is as follows:
   --G--<CommitStatement>true</CommitStatement>

A second supported global command is the RunStats command which takes the form:

```
<RunStats>
   <TargetTable> table_name </TargetTable>
   <RunPosition> position </RunPosition>
</RunStats>
```

In this global command, the table_name is the name of the table to which the runstats are targeted. The position carries values of "before" or "after" and indicates that the runstats will be run before or after the SQL statements in the SQL file 440 are executed. The RunStats command informs the ETL driver mechanism 460 to compose a 'runstats' command against the target table and execute this runstats command before or after the SQL file 440 is executed. The following is an example use of this command with global command tags:

```
--G-- <RunStats>
--G-- <TargetTable> iwh.users_r </TargetTable>
--G--    <RunPosition> after </RunPosition>
--G-- </RunStats>
```

The command that is generated and executed based on these command tags is as follows:
   Runstats on table iwh.users_r with distribution and detailed indexes all The above are examples of supported global command tags that may be used with the present invention. These examples are not exhaustive of all of the possible global command tags that may be used with the present invention. Rather, any global command tag that may be used by an ETL driver mechanism to convert SQL statements into modified SQL statements may be used without departing from the spirit and scope of the present invention.

Examples of local command tags have been provided previously above with regard to the example SQL statements handled by the present invention. For example, as set forth above, the default LoadInsert local command tag takes the form of:

```
--L-- <LoadInsert>
--L--    <LoadOption> load </LoadOption>
--L-- </LoadInsert>
``` which may be used to decompose a Select-Insert SQL statement into a Select SQL statement and an Insert SQL statement. Other local command tags are illustrated in the above examples, or may be developed based on the present disclosure as is apparent to those of ordinary skill in the art.

Thus, as previously stated, with the present invention an ETL SQL file is provided that contains SQL statements that are augmented by one or more of the global and/or local command tags discussed above. This augmented ETL SQL file is input to the ETL system where the command tags and the SQL statements are parsed by the ETL driver module and the above described corresponding conversion operations are performed to generate modified SQL commands based on the command tags and SQL statements contained in the ETL SQL file. These modified SQL commands are sent to the enterprise transient system in order to extract, transform and load the operational data from the enterprise transient system to the data warehouse storage system.

FIGS. 6-11 provide flowcharts outlining exemplary operations of the present invention. It will be understood that each block of the flowchart illustrations in FIGS. 6-11, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Figure 6:
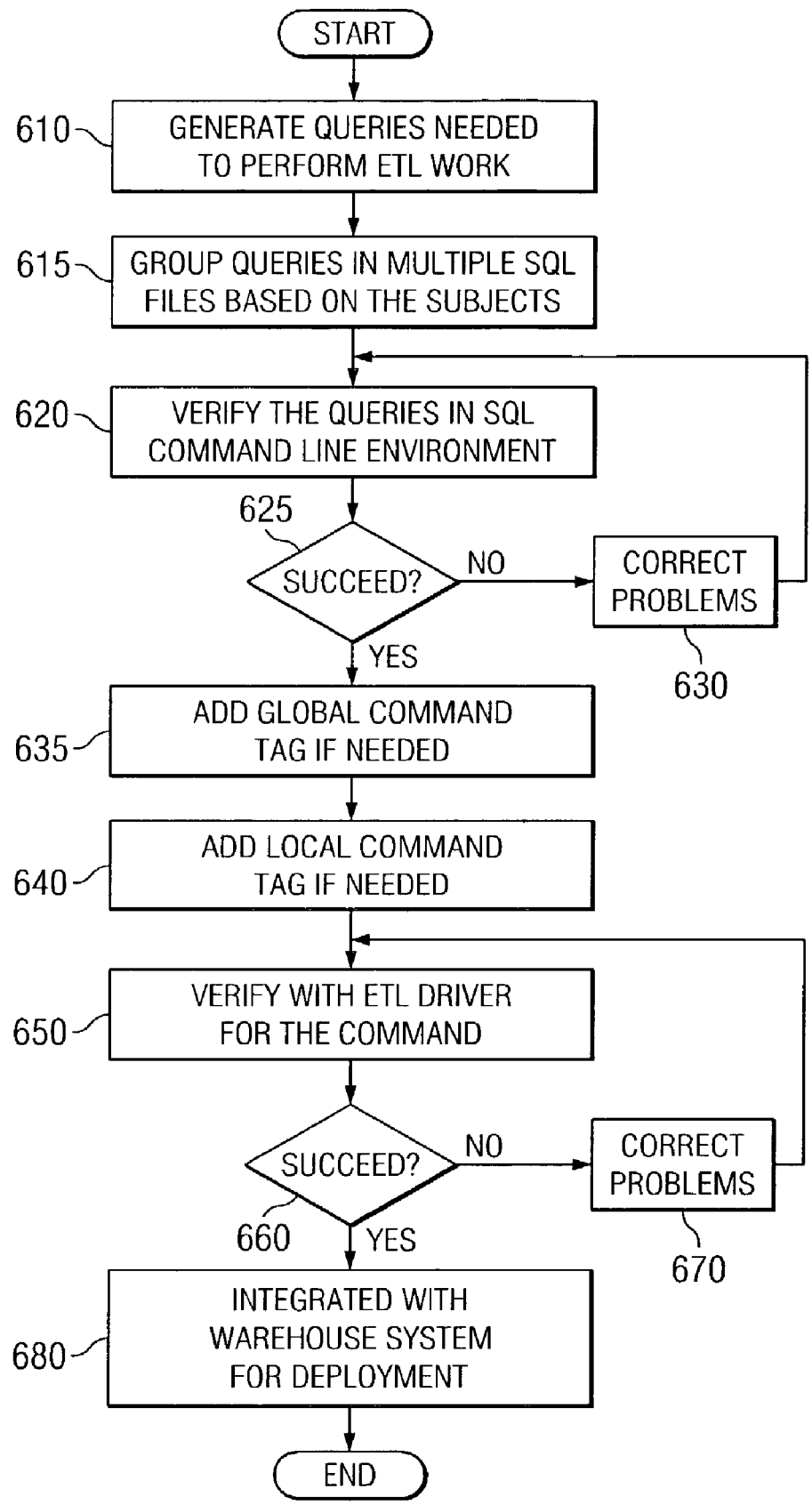
FIG. 6 is a flowchart outlining an exemplary operation for development of ETL logic in accordance with the present invention.

FIG. 6 is a flowchart outlining an exemplary operation for development of ETL logic in accordance with the present invention. As shown in FIG. 6, steps 610-630 are similar to standard methods of developing ETL logic for the generation of an ETL SQL file used to extract, transform, and load data from an enterprise system into a data warehouse in a manner that the data is accessible from the data warehouse. In step 610, queries needed to perform ETL work are generated. Thereafter, the queries are grouped into multiple SQL files based on the subjects of these queries (step 615). The queries of the SQL files are then verified in a SQL command line environment (step 620) and a determination is made as to whether the verification succeeded (step 625). If not, the problems are corrected (step 630) and the operation returns to step 620.

Once the queries in the SQL files are verified, the present invention enhances the standard SQL files with global command tags (step 635) and local command tags (step 640), if appropriate. The augmented ETL SQL files having the command tags are then verified with the ETL driver (step 650). A determination is made as to whether the verification succeeded (step 660). If not, the problems are corrected (step 670) and the operation returns to step 650. If the verification succeeded, then the ETL logic, i.e. the ETL SQL files augmented with the global and local command tags, are integrated into data warehouse system for deployment (step 680).

Having developed and integrated the ETL logic and ETL driver into the data warehouse system, the operation of the ETL driver based on the SQL statements in the ETL SQL files defining the ETL logic will now be described. The flowcharts in FIGS. 7-11 are exemplary flowcharts for the conversion of specific types of ETL SQL statements in order to illustrate the conversion and execution operations that may be performed by the ETL driver of a preferred embodiment of the present invention. However, it should be appreciated that the present invention is not limited to these specific exemplary SQL statements of the particular conversion operations set forth in the following flowcharts and many modifications may be made without departing from the spirit and scope of the present invention.

FIGS. 7A and 7B are main flowcharts outlining an exemplary operation of the present invention of the ETL driver for converting augmented SQL statements into modified SQL command instructions. The example operation shown in FIGS. 7A and 7B is specific for SQL statements and DB2 commands however the present invention is not limited to such. Rather, any database access command structure may be used without departing from the spirit and scope of the present invention. FIGS. 7A and 7B are only exemplary and is not intended to describe or imply any limitation with regard to the use or operation of the present invention.

As shown in FIG. 7A, the operation of the ETL driver starts with initializing the environment by opening/setting a warehouse database connection (step 710). Thereafter, a determination is made as to whether an ETL operation is to be performed based on the specific warehouse scheduling. (step 715). This may be determined, for example, based on an established schedule, the occurrence of an event, the input of a command to perform an ETL operation, or the like. If an ETL operation is not to be performed, the operation terminates. Otherwise, the SQL file 725 is read and parsed with the queries, local command tags and global command tags saved for use by the driver mechanism of the present invention (step 720). The parsed global command, queries with corresponding local commands are saved in the internal memory.

Thereafter, the options are set based on the global commands (step 730). After the global variables are set based on the global commands, queries in the SQL file will be executed based on their associated local command one by one in the order provided in the SQL file. A stored SQL query (step 735) and a local command tag associated with the stored SQL query are obtained from the internal memory (step 740). A check of the execute option is then made based on the local command tag associated with that stored SQL query (step 745). It is at this point that the operation branches to one of a plurality of possible operations based on the execute option in the local command tag. Each of these execute option branches, with the exception of the execution of the query directly, is illustrated in subsequent flowcharts in FIGS. 8-11 hereafter.

If the execution option for the local command tag indicates a cursor insert, the query is executed based on a cursor insert operation as shown in FIG. 8 (step 750). If the execution option for the local command tag indicates a cursor update, the query is executed based on a cursor update operation as shown in FIG. 9 (step 755). If the execution option of the local command tag indicates a load insert, the query is executed based on the load insert operation as shown in FIG. 10 (step 760). If the execution option of the local command tag indicates a load update, the query is executed based on a load update operation as shown in FIG. 11 (step 765). If there is no local command tag associated with the SQL query, the SQL query is executed directly in a normal fashion (step 770).

Following steps 750, 755, 760, 765 and/or 770, a check is performed to determine if the execution of the SQL statement succeeded (step 775). If not, an error message is generated (step 780). If the execution succeeded, a determination is made as to whether there are more SQL queries in the ETL SQL file (step 785). If not, the operation terminates. Otherwise, the operation returns to step 735 where the next query is obtained and the process repeats.

FIG. 8 is a flowchart outlining exemplary logic for parsing command tags and queries in an ETL SQL file. As shown in FIG. 8, the operation starts with the system opening the provided SQL file for read access based on the path provided for this SQL file (step 810). Then internal storage for storing the global command, the query list and local command list are initiated (step 812). The query string and local command string are then initialized (step 814).

The parser then reads a line from the SQL file (step 816) and determines if it is an end of file (step 818). If so, the SQL file is closed (step 820) and the operation terminates. If not, a determination is made as to whether the read line is an empty line (step 822). IF so, the operation returns to step 816.

If the line is not empty, a determination is made as to whether it is a comment line which starts with "--" (step 824). If it is a comment line, then the command tag associated with the line is checked (step 826). If the command tag is a local command tag, for example, "--L--", then it is appended to the local_command_string (step 832). If it is a global command tag, for example, "--G--", then the command tag is appended to the global_command_string (step 830). If the command tag is a comment with "--" but is not a local command tag or a global command tag, the comment is appended to the global_command_string (step 828).

If the line does not start with "—", then the line is appended to the query_string (step 840). A determination is then made as to whether the line ends with a query end delimiter (step 842). If not, the operation returns to step 816. Otherwise, the local_command_string is added to the local_command_list and the query_string is added to the query_list (step 844). The query_string and local_command_string are then initiated (step 846).

FIG. 9 illustrates exemplary conversion logic operations for converting SQL statements in an ETL SQL file having an associated cursor insert tag in accordance with the present invention. A summary of the conversion logic associated with the cursor insert tag is listed in Table 1. As shown in FIG. 9, the operation starts by getting the CommitRow attribute value from the tag command (step 902). A determination is then made as to whether there is an UpdateSource tag (step 904). If so, the SourceTable, SourceKeys, SourceSet and the SourceCondition attribute values are obtained (step 906). An Update Source query is generated (step 908) according to the format specifiled in T150 in Table 1 and a PreparedStatement for the Update Query is prepared (step 910).

Thereafter, or if there is no UpdateSource tag, a select query is generated (step 912). An insert query is then generated (according to the format specified in T140 in Table 1 (step 914) and a PreparedStatement for the insert query is prepared (step 914). The select query is generated according to the format specified in T130 in Table 1 and then executed (step 918) and the number of rows counter is initialized to zero (step 920). A record is fetched from the ResultSet (step 922). The values in the PreparedStatement for the Insert Query are set based on the record fetched from the ResultSet (step 924) and the PreparedStatement is executed to insert data into the target table (step 926).

A determination is made as to whether there is an Update-Source tag (step 928). If so, the values in the PreparedStatement for the Update Query are set based on the record fetched from the ResultSet (step 930). The PreparedStatement is then executed (step 932).

Thereafter, or if there is no UpdateSource tag, a determination is made as to whether the number of rows counter is greater than the CommitRow value (step 934). If so, a commit operation is executed (step 936) and the number of rows counter is reinitialized to zero (step 938). If the number of rows is not greater than the CommitRow value, then the number of rows is incremented (step 940). A determination is then made as to whether there are any more records in the ResultSet (step 942). If so, the operation returns to step 922; otherwise, the operation terminates.

FIG. 10 illustrates exemplary conversion logic operations for converting SQL statements in an ETL SQL file having an associated cursor update tag in accordance with the present invention. A summary of the conversion logic associated with the cursor update tag is listed in Tables 2 and 3. As shown in FIG. 10, the operation starts by obtaining the CommitRow attribute value from the command tag (step 1002). The PrimaryKeys, UpdateType, SelectPrimaryKeys, and UpdateConditions attribute values are obtained (step 1004). A check is then performed of the UpdateType attribute value (step 1006). If the attribute value is "composite", then the conversion will be done according to the format listed in Table 3. A select query using composite rules is generated according to the format specified in T330 (step 1008) and an update query using simple rules is generated according to the format specified in T340 (step 1010). If the attribute value is "simple", then the conversion will be done according to the format listed in Table 2. A select query using simple rules is generated according to the format specified in T230 (step 1012) and an update query using simple rules is generated according to the format specified in T240 (step 1014).

After either of steps 1010 or 1014, a PreparedStatement for the update query is prepared (step 1016). The select query is executed (step 1018) and the number of rows counter is set to zero (step 1020). A record is fetched from the ResultSet (step 1022) and the values the PreparedStatement are set based on the fetched record (step 1024). The PreparedStatement is then executed (step 1026).

Thereafter, a determination is made as to whether the number of rows counter is greater than the CommitRow value (step 1028). If so, a commit operation is executed (step 1030) and the number of rows counter is reinitialized to zero (step 1032). If the number of rows counter is not greater than the CommitRow value, then the number of rows counter is incremented (step 1034). A determination is then made as to whether there are any more records in the ResultSet (step 1036). If so, the operation returns to step 1022; otherwise, the operation terminates.

FIG. 11 illustrates exemplary conversion logic operations for converting SQL statements in an ETL SQL file having an associated load insert tag in accordance with the present invention. A summary of the conversion logic associated with the load insert tag is listed in Table 4. As shown in FIG. 11, the operation starts by obtaining the LoadType and LoadParameter attribute values from the command tag (step 1102). A select query is generated according to the format specified in T430 (step 1104) and an insert query is generated according to the format specified in T440 (step 1106). An export command using the select query is then composed according to the format specified in T450 (step 1108).

A database connection command is written to an external script file 1050 (step 1110) and the export command is then written to the external script file 1150 (step 1112). A load command is then generated using the insert query based on the LoadType according to the format specified in T460 (step 1114). The load command is then written to the external script file 1150 (step 1116) and a close database connection command is written to the external script file 1150 (step 1118).

The external script file 1150 is then executed (step 1120). A determination is made as to whether the load/import succeeded (step 1122). If so, the execution log is checked (step 1124) and a determination is made as to whether any error is in the log (step 1126). If there is an error in the log or if the load/import did not succeed, an error message is generated (step 1130).

Figure 12:
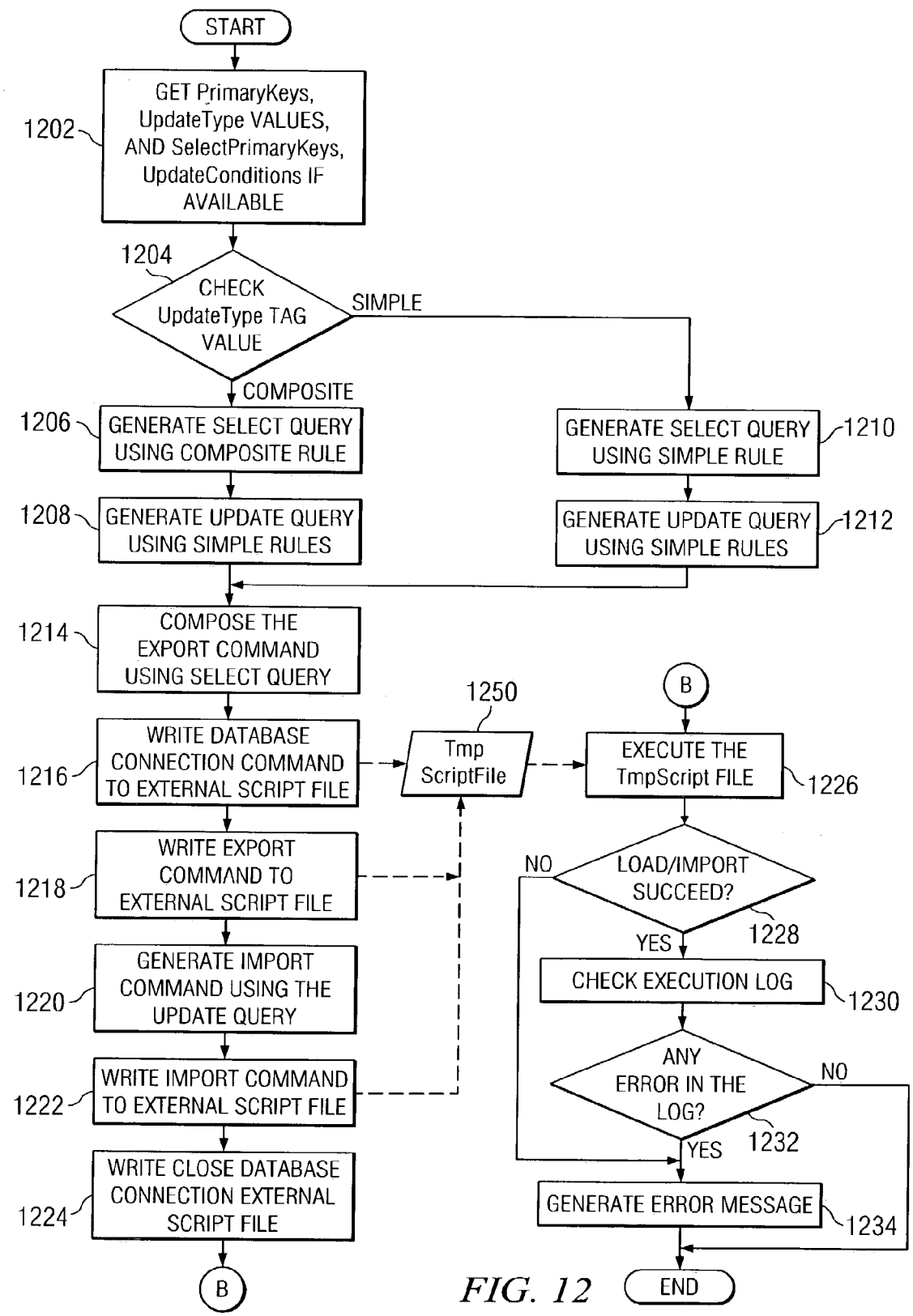
FIG. 12 illustrates exemplary conversion logic operations for converting SQL statements in an ETL SQL file having an associated load update tag in accordance with the present invention.

FIG. 12 illustrates exemplary conversion logic operations for converting SQL statements in an ETL SQL file having an associated load update tag in accordance with the present invention. A summary of the conversion logic associated with the load update tag is listed in Tables 5 and 6. As shown in FIG. 12, the operation starts with obtaining the PrimaryKeys, UpdateType, SelectPrimaryKeys, and UpdateConditions attribute values (step 1202). A check of the UpdateType attribute value is then performed (step 1204). If the UpdateType is "composite", then the conversion will be done according to the format listed in Table 6. A select query using composite rules is generated according to the format specified in T630 (step 1206), and an update query using composite rules is generated according to the format specified in T640 (step 1208). If the UpdateType is "simple", then the conversion will be done according to the format listed in Table 5. A select query using simple rules is generated according to the format specified in T530 (step 1210) and an update query using simple rules is generated according to the format specified in T540 (step 1212).

Either after step 1208 or 1212, an export command is composed using the select query according to the format specified in T550 or T650 based on the UpdateType (step 1214). A database connection command is then written to an external script file 1250 (step 1216). An export command is then written to the external script file 1250 (step 1218) and an import command using the update query is generated according to the format specified in T560 or T660 based on the UpdateType (step 1220). The import command is then written to the external script file 1250 (step 1222). A close database connection command is then written to the external script file 1250 (step 1224) and the external script file 1250 is executed (step 1126).

A determination is then made as to whether the load/import succeeded (step 1228). If so, the execution log is checked (step 1230) to determine if there is any error (step 1232). If so, or if the load/import did not succeed, an error message is generated (step 1234).

Thus, the present invention provides an infrastructure for building a efficient warehouse ETL system. The present invention provides a mechanism for decomposing SQL statements in an ETL SQL file into modified SQL instructions that perform extract operations, and transform and load operations as a plurality of transactions. In this way, the log memory requirements and execution time is reduced. The present invention also outlined a process of how an efficient data warehouse ETL system can be deployed based on this invention.

A set of command tags is defined to provide the instruction for query conversion. The command tags are inserted in the SQL file as a set of comment lines with special symbols. Consequently these command tags will be interpreted by the ETL driver, but will not affect the testing through the command line execution. The SQL statements or queries in an ETL SQL file, in accordance with the present invention, are interpreted based on command tags inserted into the ETL SQL file to thereby augment the ETL SQL file with indications as to how the SQL statements are to be executed. The interpretation of the command tags and the decomposition of the SQL statements is performed using an ETL driver that is developed to recognize the command tags, convert the SQL statements to a plurality of transactions based on the command tags, and execute the transactions to perform ETL operations. The implementation logic for the ETL driver may be generic and can be based on the functions provided by most of the data warehouse systems.

Because the command tags are added to externalized ETL SQL files, the externalized ETL SQL file can be tested with SQL command line environment testing. This can highly increase the productivity of the development for a warehouse system. It also provides a system with high maintainability.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of performing data warehousing operations wherein the method is executed by a processor, comprising:

parsing a first instruction stored in memory having a command tag, wherein the first instruction is a combination Structured Query Language (SQL) instruction performed as a single transaction, and wherein the command tag indicates a manner of execution of the first instruction;

converting the first instruction into a set of second instructions based on the command tag, wherein each instruction in the set of second instructions is a modified SQL instruction and wherein converting the first instruction into the set of second instructions based on the command tag includes decomposing the first instruction into a plurality of modified SQL instructions performed as a set of transactions; and applying the set of second instructions to data of a source computing device to thereby warehouse the data in a data warehouse storage device.

2. The method of claim 1, wherein the first instruction is an instruction in a file that contains instructions for extracting data from the source computing device and loading the data into the data warehouse storage device.

3. The method of claim 2, wherein the file is a Structured Query Language (SQL) file.

4. The method of claim 2, wherein the command tag is part of a comment in the file.

5. The method of claim 1, wherein the command tag is one of a global command tag and a local command tag.

6. The method of claim 1, wherein converting the first instruction into the set of second instructions based on the command tag includes retrieving command instructions from a decomposition database based on the command tag.

7. The method of claim 1, wherein the set of second instructions includes a Select SQL query and one or more of an Insert SQL query, an Update SQL query, an Export SQL command, and a Load SQL command.

8. The method of claim 1, wherein the first instruction comprises at least one of a cursor insert instruction, a cursor update instruction, an export/load insert instruction, and an export/import update instruction.

9. The method of claim 1, wherein the step of converting the first instruction into the set of second instructions based on the command tag is performed in response to the command tag.

10. A computer program product including a computer recordable-type medium storing a computer program performing data warehousing operations, comprising:

first instructions for parsing a first Structured Query Language (SQL) statement having a command tag, wherein the first SQL statement is a SQL statement performed as a single transaction, and wherein the command tag indicates a manner of execution of the first SQL statement;

second instructions for converting the first SQL statement into a set of second SQL statements based on the command tag, wherein the second instructions for converting the first SQL statement into the set of second SQL statements based on the command tag include instructions for decomposing the first SQL statement into a plurality of SQL statements performed as a set of transactions; and third instructions for applying the set of second SQL statements to data of a source computing device to thereby warehouse the data in a data warehouse storage device.

11. The computer program product of claim 10, wherein the first SQL statement is a statement in a file that contains SQL statements for extracting data from the source computing device and loading the data into the data warehouse storage device.

12. The computer program product of claim 11, wherein the command tag is part of a comment in the file.

13. The computer program product of claim 10, wherein the first SQL statement is a combination SQL statement, and wherein each SQL statement in the set of second SQL statements is a modified SQL instruction.

14. The computer program product of claim 13, wherein the first SQL statement is one of a cursor insert instruction, a cursor update instruction, an export/load insert instruction, and an export/import update instruction.

15. The computer program product of claim 13, wherein the set of second SQL statements includes a Select SQL query and one or more of an Insert SQL query, an Update SQL query, an Export SQL command, and a Load SQL command.

16. The computer program product of claim 10, wherein the command tag is one of a global command tag and a local command tag.

17. The computer program product of claim 10, wherein the second instructions for converting the first SQL statement into the set of second SQL statements based on the command tag include instructions for retrieving command instructions from a decomposition database based on the command tag.

* * * * *